US012341840B2

(12) United States Patent
Mate et al.

(10) Patent No.: US 12,341,840 B2
(45) Date of Patent: Jun. 24, 2025

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Sujeet Shyamsundar Mate, Tampere (FI); Saba Ahsan, Espoo (FI); Igor Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 17/914,852

(22) PCT Filed: Mar. 24, 2021

(86) PCT No.: PCT/FI2021/050207
§ 371 (c)(1),
(2) Date: Sep. 27, 2022

(87) PCT Pub. No.: WO2021/198554
PCT Pub. Date: Oct. 7, 2021

(65) Prior Publication Data
US 2023/0146498 A1 May 11, 2023

(30) Foreign Application Priority Data

Apr. 3, 2020 (FI) ...................................... 20205355

(51) Int. Cl.
*H04L 65/756* (2022.01)
*H04L 65/403* (2022.01)
(Continued)

(52) U.S. Cl.
CPC .......... *H04L 65/756* (2022.05); *H04L 65/403* (2013.01); *H04N 19/154* (2014.11); *H04N 19/164* (2014.11)

(58) Field of Classification Search
CPC ... H04L 65/756; H04L 65/403; H04N 19/154; H04N 19/164; H04N 7/147;
(Continued)

(56) References Cited

U.S. PATENT DOCUMENTS

| 2009/0231415 A1* | 9/2009 | Moore ............... H04N 21/2662 348/E7.083 |
| 2016/0205165 A1* | 7/2016 | Casalena .......... H04N 21/23439 709/219 |
| 2018/0164593 A1* | 6/2018 | Van Der Auwera ......................... H04N 17/004 |

FOREIGN PATENT DOCUMENTS

WO    WO 2019/117866 A1    6/2019

* cited by examiner

*Primary Examiner* — Yosef K Laekemariam
(74) *Attorney, Agent, or Firm* — McCarter & English, LLP

(57) ABSTRACT

Some embodiments relate to a method including obtaining information of available quality features of a sender device for providing omnidirectional visual media content; selecting one or more of the available quality features; and providing an indication of the selected one or more of the available quality features. There is also provided a method including obtaining information of available quality features of a receiver device for processing omnidirectional visual media content; providing an indication of the available quality features; receiving from a sender device indication of available quality features of the sender device among the available quality features of the receiver device; selecting one of the quality features, which are available both in the sender device and in the receiver device; and providing an indication of the selected quality feature.

20 Claims, 14 Drawing Sheets

(51) Int. Cl.
*H04N 19/154* (2014.01)
*H04N 19/164* (2014.01)

(58) Field of Classification Search
CPC .. H04N 13/194; H04N 13/239; H04N 13/383;
H04N 13/117; H04N 13/161; H04N
13/344; H04N 13/366; H04N 19/70;
H04N 19/597; H04N 21/234345; H04N
21/6587; H04N 21/8456; H04N 21/816
See application file for complete search history.

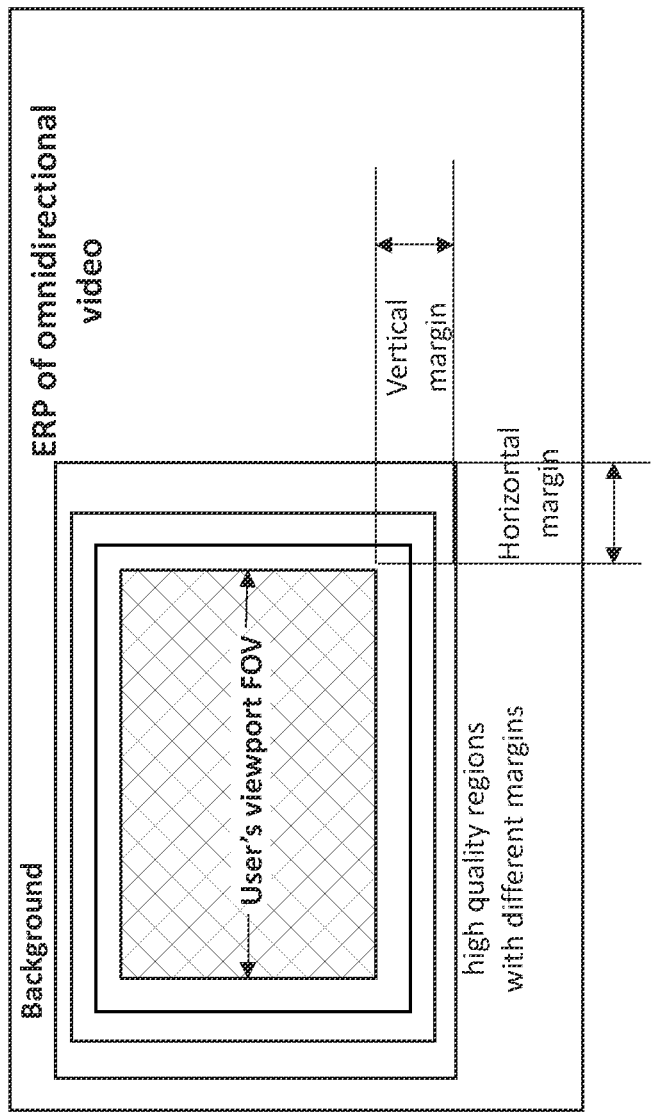
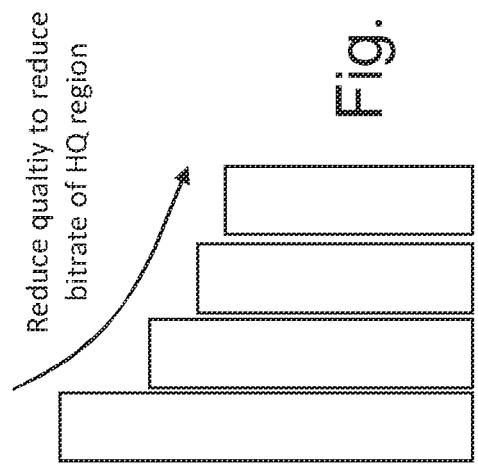
Fig. 5a
Fig. 5b
Fig. 5c

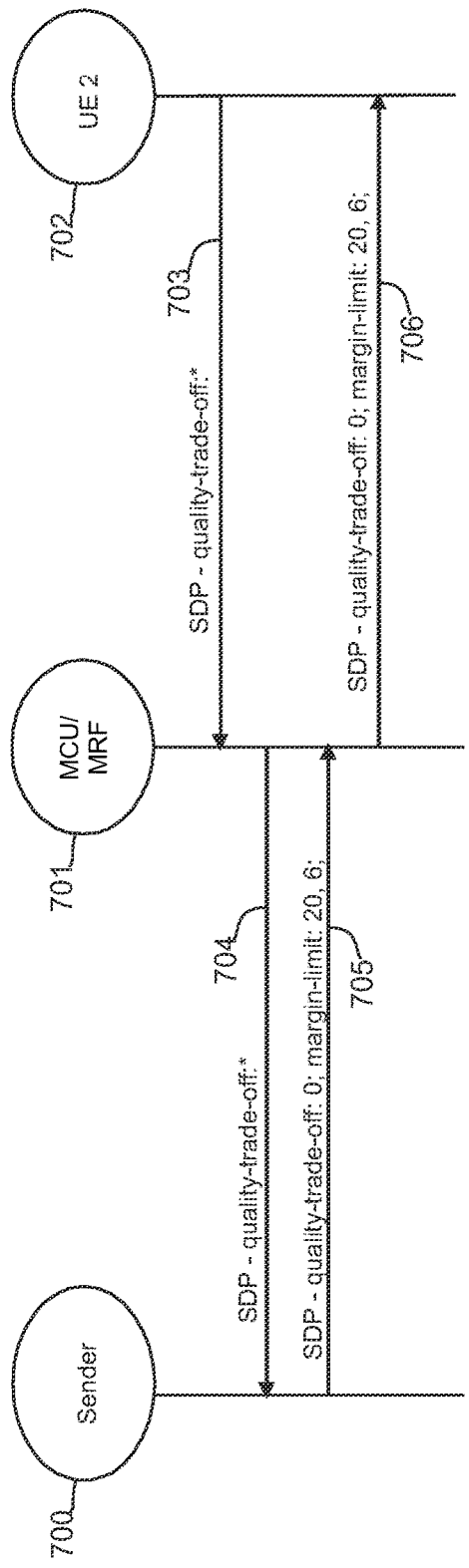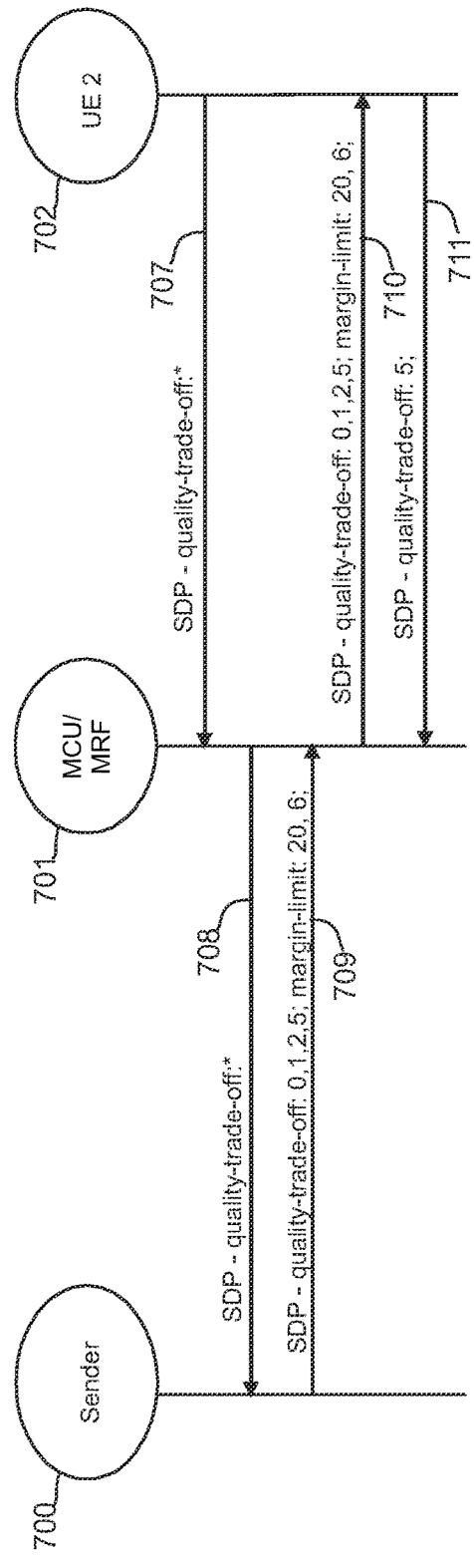
Fig. 7a
Fig. 7b

METHOD, AN APPARATUS AND A COMPUTER PROGRAM PRODUCT FOR VIDEO ENCODING AND VIDEO DECODING

CROSS REFERENCE TO RELATED APPLICATION

This patent application is a U.S. National Stage application of International Patent Application Number PCT/FI2021/050207 filed Mar. 24, 2021, which is hereby incorporated by reference in its entirety, and claims priority to FI 20205355 filed Apr. 3, 2020.

TECHNICAL FIELD

The present solution generally relates to video encoding and/or transmission and video decoding and/or reception.

BACKGROUND

Devices that are able to capture image and video have evolved from devices capturing a limited angular field of view to devices capturing 360-degree content. These devices are able to capture visual and audio content all around them, i.e. they can capture the whole angular field of view, which may be referred to as 360 degrees field of view. More precisely, the devices can capture a spherical field of view (i.e., 360 degrees in all spatial directions). In addition to the new types of image/video capturing devices, also new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is the entire sphere, is commonly referred to as virtual reality (VR) or omnidirectional video and is believed to be the common way people will experience media content in the future.

Third Generation Partnership Project (3GPP) Immersive Teleconferencing and Telepresence for Remote Terminals (ITT4RT) relates to omnidirectional video delivery in covering point to point and multiparty conversational applications. Viewport dependent delivery is a method to improve efficiency by reducing the bit rate of the content which is unwatched because it is outside of the user's viewport.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising:
  obtaining information of available quality features of a sender device for providing omnidirectional visual media content;
  selecting one or more of the available quality features; and
  providing an indication of the selected one or more of the available quality features.

According to a second aspect, there is provided an apparatus comprising means for:
  obtaining information of available quality features of a sender device for providing omnidirectional visual media content;
  selecting one or more of the available quality features; and
  providing an indication of the selected one or more of the available quality features.

According to a third aspect, there is provided a method comprising:
  obtaining information of available quality features of a receiver device for processing omnidirectional visual media content;
  providing an indication of the available quality features;
  receiving from a sender device indication of available quality features of the sender device among the available quality features of the receiver device;
  selecting one of the quality features, which are available both in the sender device and in the receiver device; and
  providing an indication of the selected quality feature.

According to a fourth aspect, there is provided an apparatus comprising means for:
  obtaining information of available quality features of a receiver device for processing omnidirectional visual media content;
  providing an indication of the available quality features;
  receiving from a sender device indication of available quality features of the sender device among the available quality features of the receiver device;
  selecting one of the quality features, which are available both in the sender device and in the receiver device; and
  providing an indication of the selected quality feature.

According to a fifth aspect, there is provided computer program product comprising computer program code configured to, when executed on at least one processor, cause an apparatus or a system to:
  obtain information of available quality features of a sender device for providing omnidirectional visual media content;
  select one or more of the available quality features; and
  providing an indication of the selected one or more of the available quality features.

According to a sixth aspect, there is provided computer program product comprising computer program code configured to, when executed on at least one processor, cause an apparatus or a system to:
  obtain information of available quality features of a receiver device for processing omnidirectional visual media content;
  provide an indication of the available quality features;
  receive from a sender device indication of available quality features of the sender device among the available quality features of the receiver device;
  select one of the quality features, which are available both in the sender device and in the receiver device; and
  provide an indication of the selected quality feature.

According to an embodiment, the method further comprises receiving from a receiver device indication of available quality features of the receiver device for processing omnidirectional visual media content; examining, on the basis of the received indication, which quality features are available both in the sender device and in the receiver device; and selecting one or more of the quality features, which are available both in the sender device and in the receiver device.

According to an embodiment, the method further comprises receiving from the receiver device indication of a quality feature selected by the receiver device; and streaming the omnidirectional visual media content using the selected quality feature.

According to an embodiment, at least some of the information is transmitted over a Session Description Protocol.

According to an embodiment, information of margin limits is provided in the bitstream.

According to an embodiment, the quality feature is one of the following:
  a high quality instead of consistent quality;
  consistent quality instead of high quality;
  high quality with specific margin(s);
  automatic adjustment of consistent vs. high quality based on indication received from the receiver device;
  high quality with directional extended margins based on object tracking;
  high quality with directional extended margins based on audio events;
  high quality with directional extended margins based on head motion.

According to an embodiment, a margin is extended in a direction of head motion, when high quality with directional extended margins based on head motion option has been selected.

According to an embodiment, the quality feature is indicated as a quality-trade-off parameter.

DESCRIPTION OF THE DRAWINGS

In the following, various embodiments will be described in more detail with reference to the appended drawings, in which

FIGS. 5a and 5b illustrate an example of the high quality versus consistent quality trade-off;

FIG. 5c illustrates the effect of quality reduction to the bitrate, in accordance with an example;

FIGS. 7a-7c show some example signaling flows for quality trade off, in accordance with an embodiment;

DESCRIPTION OF EXAMPLE EMBODIMENTS

A 3GPP work item on "Support of Immersive Teleconferencing and Telepresence for Remote Terminals" (ITT4RT) as defined in SP-180985 was approved during SA #82 in December 2018. The objective of this Work Item is to specify VR support in MTSI in TS 26.114 and IMS-based Telepresence in TS 26.223 to enable support of an immersive experience for remote terminals joining teleconferencing and telepresence sessions. For MTSI, the work is expected to enable scenarios with two-way audio and one-way immersive video, e.g., a remote single user wearing an HMD participates to a conference will send audio and optionally 2D video (e.g., of a presentation, screen sharing and/or a capture of the user itself), but receives stereo or immersive voice/audio and immersive video captured by an omnidirectional camera in a conference room connected to a fixed network.

More specifically, this work item aims to conduct normative work in TS 26.114 and also in TS 26.223, toward specifying the following aspects for immersive video and immersive voice/audio support:
  a) Recommendations of audio and video codec configurations (e.g., profile, level, and encoding constraints of IVAS, EVS, HEVC, AVC as applicable) to deliver high quality VR experiences
  b) Constraints on media elementary streams and RTP encapsulation formats
  c) Recommendations of SDP configurations for negotiating of immersive video and voice/audio capabilities. For immersive voice and audio considerations using IVAS, this is dependent on specification of the IVAS RTP payload format to be developed as part of the IVAS WI
  d) An appropriate signalling mechanism, e.g., RTP/RTCP-based, for indication of viewport information to enable viewport-dependent media processing and delivery The RTP payload format and SDP parameters to be developed under the IVAS WI will be considered to support use of the IVAS codec for immersive voice and audio. The RTP payload format and SDP parameters for HEVC will be considered to support immersive video.

For video codec(s), use of omnidirectional video specific Supplemental Enhancement Information (SEI) messages for carriage of metadata required for rendering of the omnidirectional video will be considered. Suitable video codec configurations for omnidirectional video specified in TS 26.118 as part of the VRStream Rel-15 work item will also be considered, subject to their applicability to the conversational service environment.

In case the IVAS codec cannot be finalized in the time frame of this work item, this work will provide only limited support for immersive voice/audio using the EVS codec 30 based on multi-mono EVS coding, and in that case, full support for immersive voice/audio will be added subsequently when the IVAS codec is available as a separate work item.

Next, some examples of use cases will be explained.

Figure 8A:
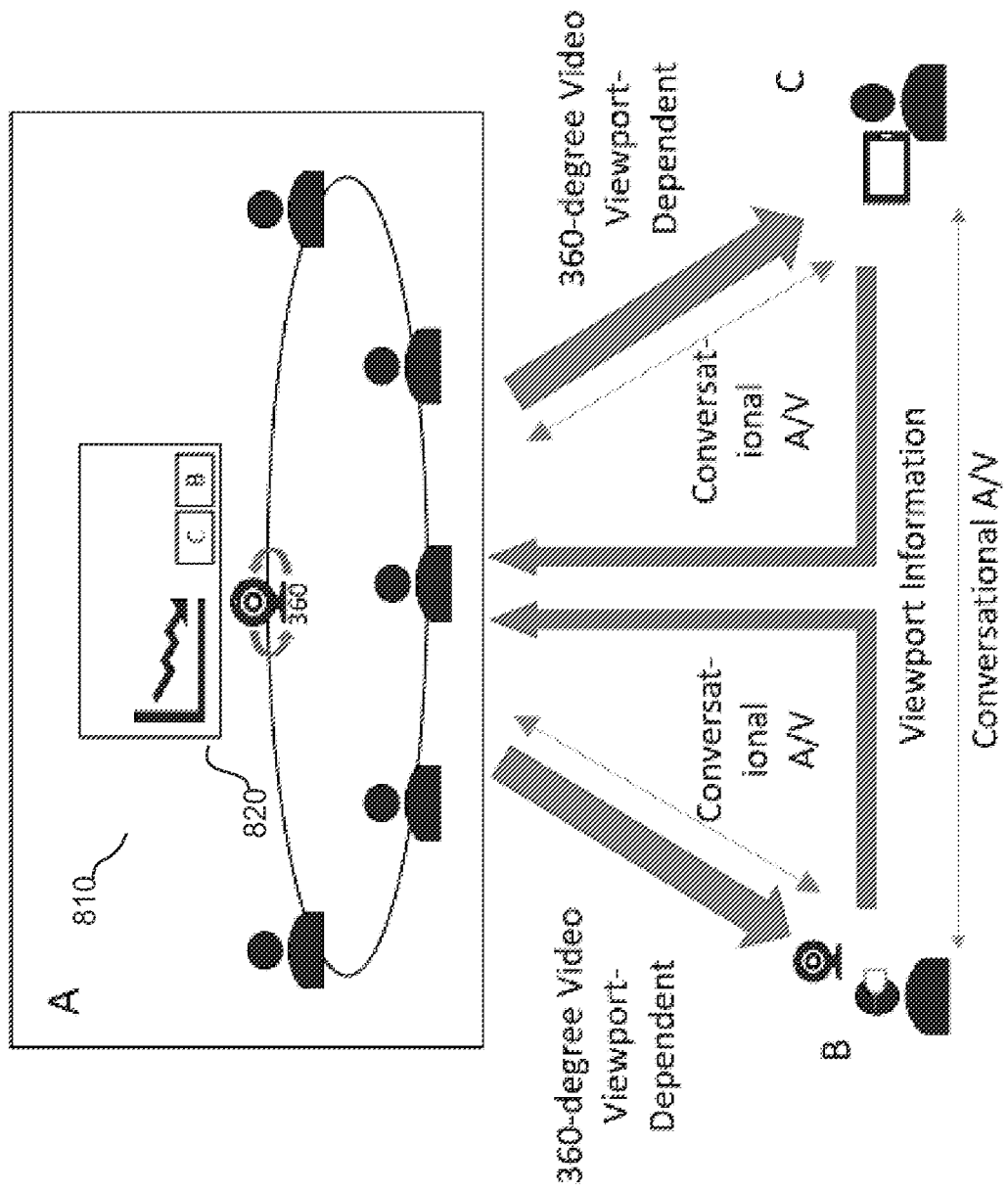
FIGS. 8a-8c show examples of a conference room with some participants.

A group of colleagues is having a meeting in conference room A (see FIG. 8a). The room consists of a conference table (for physically present participants), a 360-degree camera, and a view screen. Two of their colleagues, Bonnie (B) and Clyde (C) are travelling and join the meeting through a conference call.

Participants in conference room A use the screen to display a shared presentation and/or video streams coming from Bonnie and Clyde.

Bonnie joins the conference from her home using a Head Mounted Display (HMD) and a camera that captures her video. She has a 360-degree view of the conference room.

Clyde joins the conference from the airport using his mobile phone. He also has a 360-degree view of the conference room on his mobile screen and uses his mobile camera for capturing his own video.

Both Bonnie and Clyde can see the screen in the conference room as part of the 360-degree video. They also have the option to bring into focus any of the incoming video streams (a presentation or the other remote participant's camera feed) using their own display devices. The manner in which this focused stream is displayed is a function of their display device and is not covered in this use case.

Within the 3GPP MTSI TS 26.114 and Telepresence TS 26.223 specifications, the above use case can be realized in two possible configurations, which are explained below. The participants are referred to as A, B and C from here onwards.

In a first scenario, shown in FIG. 8a, the call is set up without the support of any media-aware network elements. Both remote participants, B and C, send information about their viewport orientation to A, which in turn sends them a viewport-dependent video stream from the omnidirectional camera.

Figure 8B:
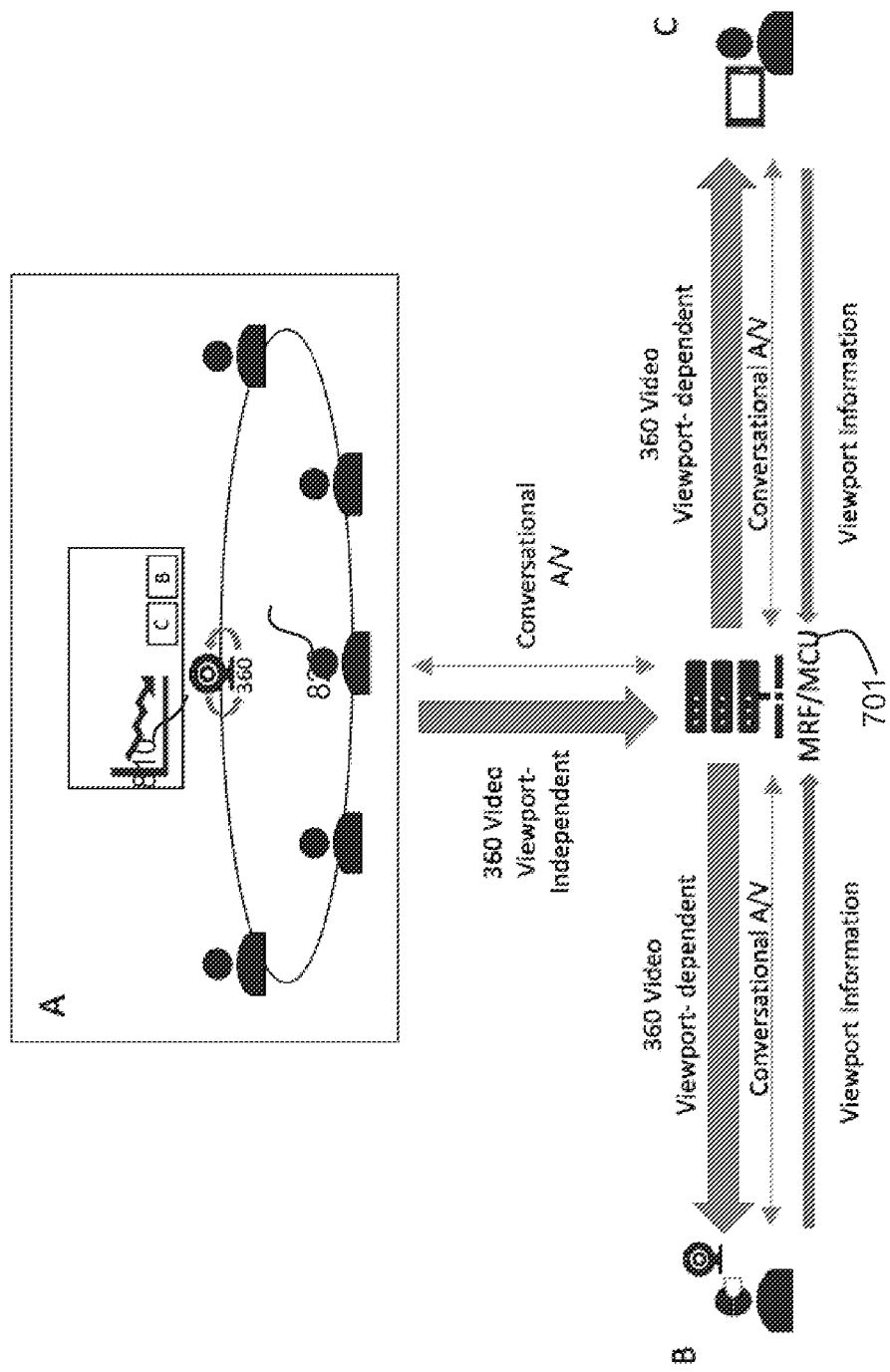

In a second scenario, the call is setup using a network function, which may be performed by either a Media Resource Function (MRF) or a Media Control Unit (MCU). In this case, the MRF/MCU receives a viewport-independent stream from A. Both B and C, send viewport orientation information to the MRF/MCU and receive viewport-dependent streams from it. FIG. 8b illustrates the scenario. The A/V channel for conversational non-immersive content also flows through the MRF/MCU in the figure.

The use case aims to enable immersive experience for remote terminals joining teleconferencing and telepresence sessions, with two-way audio and one-way immersive video, e.g., a remote single user wearing an HMD participates to a conference will send audio and optionally 2D video (e.g., of a presentation, screen sharing and/or a capture of the user itself), but receives stereo or immersive voice/audio and immersive video captured by an omnidirectional camera in a conference room connected to a fixed network.

Private side communication is also expected to be enabled as part of this use case. For instance, two users attending the conference may wish to talk privately and do not want to be heard by others. In this case, the audio information exchanged between these two users should not be transmitted to others, and the content of their conversation should be protected and only be fully rendered on their devices. Others may know that these users are interacting but would not be able to hear the specific content.

A special variation of this use case is when the 360 camera capture occurs not in a conference room but on a user device.

Figure 8C:
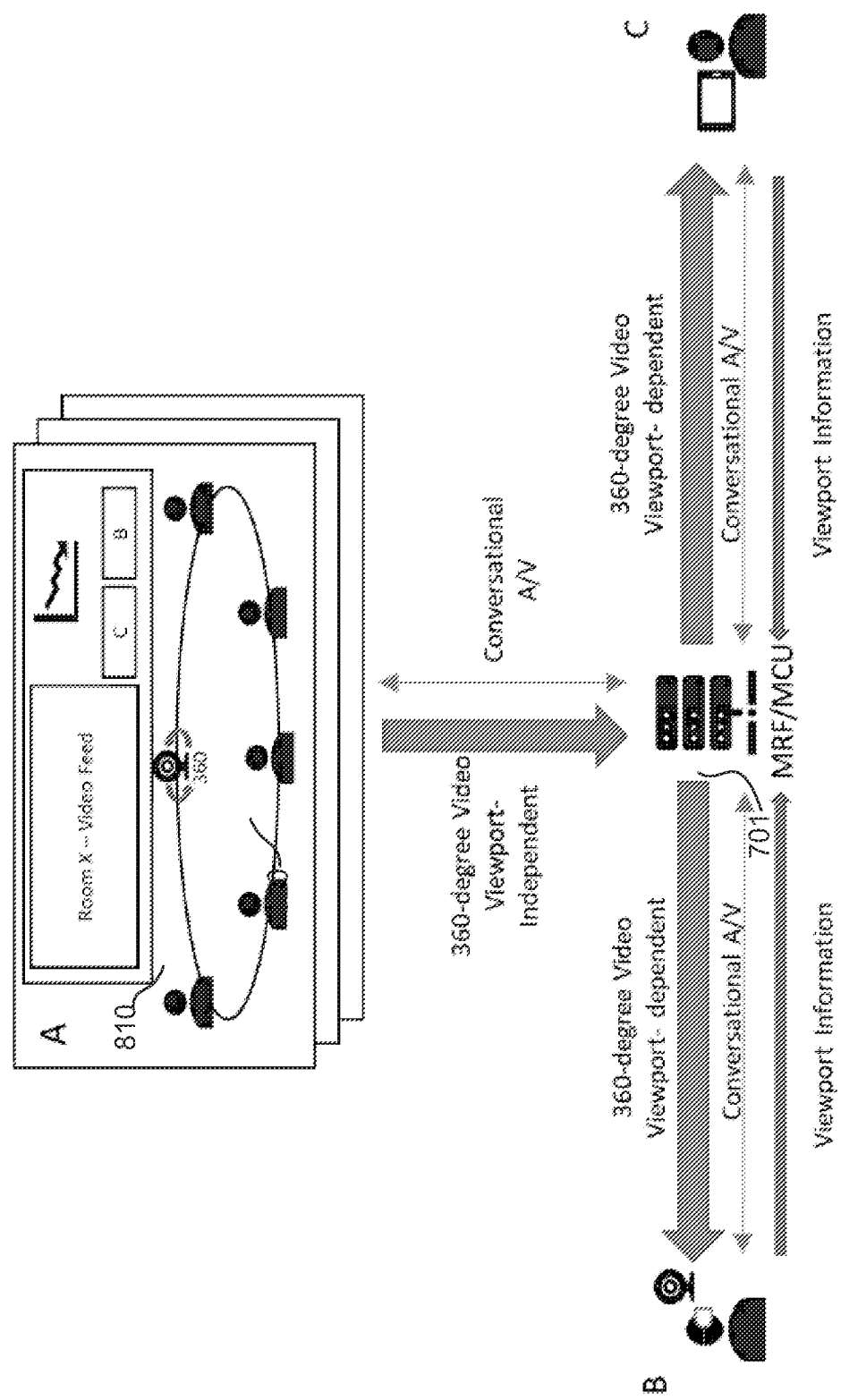

In a third scenario, multiple conference rooms are sending 360-degree video to an MRF/MCU. The rooms may choose to receive 2D video streams from other participants including one of the other rooms, which is displayed on the screen in the room. A pictorial representation is shown in FIG. 8c.

The remote (single) users can choose to view any one or none (e.g., when only viewing the screenshare) of the available 360-degree videos from the multiple rooms. Switching from one room to another may be triggered manually, or using other mechanisms, such as, viewing direction or dominant speaker. However, for the case of the dominant speaker, it may be important to consider effects of motion sickness while switching from one video to another as the user may not be sufficiently prepared for the switch.

The MRF/MCU may signal to pause the receiving 360-degree video from any of the rooms that do not currently have any active viewers. The streams can be resumed if and when there are viewers.

The presentation/screenshare stream is distributed to the single users and the rooms as a separate stream and can be identified using an explicit "a-content: slides" SDP field. The single users may view the stream as an overlay on top of the 360-degree video.

If the area of interest in the 360-degree video is limited (the preferred FoV is defined and negotiated between the participants) or the motion outside the FoV is limited, the background area (outside the viewport) can be transmitted as a still image to maintain continuity in the 360-degree view. The still-image may be updated at regular intervals or as needed.

A still-image background area can also be used for placing overlays and avoiding unnecessary bandwidth utilization. In the scenario in the figure, this background area would be the wall with the screen and the presentation overlay may be placed on top of the screen for a better visual experience.

Overlays may also be used for other 2D streams. These include videos from the single users and 2D video streams from the other rooms. Spatial audio should be associated with overlays when placed in the 360-degree view, i.e., the sound should appear to originate from the placement of the overlay, not necessarily associated with the elements within the video.

MRF/MCU based media processing may be used for creating 360-degree views combining multiple input sources, e.g., 360-degree video with limited FoV, still image for background, overlays of screenshare and other 2D videos, etc., when the device capabilities are limited.

Figure 11:
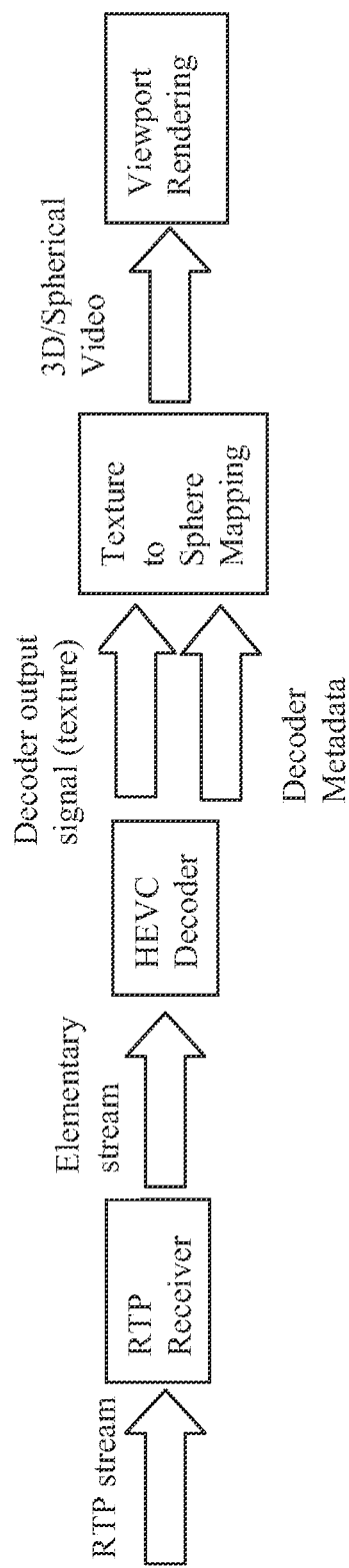
FIG. 11 shows a potential receiver architecture for VR support over MTSI and IMS Telepresence.

FIG. 11 provides an overview of a possible receiver architecture that reconstructs the spherical video in an MTSI or IMS Telepresence UE. It should be noted that this Fig. does not represent an actual implementation, but a logical set of receiver functions. Based on one or more received RTP media streams, the UE parses, possibly decrypts and feeds the elementary stream to the HEVC decoder. The HEVC decoder obtains the decoder output signal, referred to as the "texture", as well as the decoder metadata. The Decoder Metadata contains the Supplemental Information Enhancement (SEI) messages, i.e., information carried in the omnidirectional video specific SEI messages, to be used in the rendering phase. In particular, the Decoder Metadata may be used by the Texture-to-Sphere Mapping function to generate a spherical video (or part thereof) based on the decoded output signal, i.e., the texture. The viewport is then generated from the spherical video signal (or part thereof) by taking into account the viewport position information from sensors, display characteristics as well as possibly other metadata such as initial viewport information. A similar receiver architecture can also be supported for the AVC codec.

For 360 degree video, some potential solutions can consider the following principles:
   The RTP stream would contain an HEVC or an AVC bitstream with omnidirectional video specific SEI messages. In particular, the omnidirectional video specific SEI messages as defined in ISO/IEC 23008-2 and ISO/IEC 14496-10 may be present.
   The video elementary stream(s) may be encoded following the requirements in the Omnidirectional Media Format (OMAF) specification ISO/IEC 23090-2, clause 10.1.2.2.

Relevant SEI messages contained in the elementary stream(s) with decoder rendering metadata may include the following information as per ISO/IEC 23008-2 and ISO/IEC 14496-10:

Region-wise packing information, e.g., carrying region-wise packing format indication and also any coverage restrictions Projection mapping information, indicating the projection format in use, e.g., Equirectangular projection (ERP) or Cubemap projection (CMP)

Padding, indicating whether there is padding or guard band in the packed picture Frame packing arrangement, indicating the frame packing format for stereoscopic content Content pre-rotation information, indicating the amount of sphere rotation, if any, applied to the sphere signal before projection and region-wise packing at the encoder side The output signal, i.e., the decoded picture or "texture", is then rendered using the Decoder Metadata information contained in relevant SEI messages contained in the video elementary streams. The Decoder Metadata is used when performing rendering operations such as region-wise unpacking, projection de-mapping and rotation toward creating spherical content for each eye.

Viewport-dependent processing could be supported for both point-to-point conversational sessions and multiparty conferencing scenarios and be achieved by sending from the MTSI receiver RTCP feedback or RTP header extension messages with the desired viewport information and then encoding and sending the corresponding viewport by the MTSI sender or by the media gateway, e.g., MRF. This is expected to deliver resolutions higher than the viewport independent approach for the desired viewport. The transmitted RTP stream from the MTSI sender or media gateway may also include the actual viewport or coverage information, e.g., in an RTP header extension message, as the 360 degree video generated, encoded and streamed by the sender may cover a larger area than the desired viewport. The media formats for tiling and sub-picture coding as described in the viewport-dependent profile of OMAF in ISO/IEC 23090-2 etc. are not relevant for the 5G conversational setting. Instead, viewport-dependent processing based on tiling and sub-picture coding could be realized via RTP/RTCP based protocols that are supported by MTSI and IMS-based telepresence.

OMAF video profiles specified in ISO/IEC 23090-2 are based on HEVC Main 10 Profile, Main Tier, Level 5.1 in order to deliver high quality VR experiences. In the meantime, MTSI in TS 26.114 mandates H.265 (HEVC) Main Profile, Main Tier, Level 3.1 for video, and IMS telepresence in TS 26.223 mandates H.265 (HEVC) Main Profile, Main Tier, Level 4.1 for video.

For achieving video quality required by VR services, it may be recommended that the video codecs for VR support in MTSI and IMS telepresence are aligned with OMAF and/or TS 26.118, e.g., HEVC Main 10 Profile, Main Tier, Level 5.1 may be recommended for MTSI and IMS telepresence in TS 26.114 and TS 26.223 to ensure a high-quality VR experience. It is expected that both MTSI client and MTSI gateway codec requirements are aligned with these recommended video codec requirements for VR support. It is not expected that the mechanisms for session setup and negotiation would be different because of this changed requirement on video codecs.

With regards to the negotiation of SEI messages for carriage of decoder rendering metadata, procedures specified in IETF RFC 7798 on the RTP payload format for HEVC may be reused. In particular, RFC 7798 can allow exposing SEI messages related to decoder rendering metadata for omnidirectional media in the SDP using the 'sprop-sei' parameter, which allows to convey one or more SEI messages that describe bitstream characteristics. When present, a decoder can rely on the bitstream characteristics that are described in the SEI messages for the entire duration of the session. Intentionally, RFC 7798 does not list an applicable or inapplicable SEI messages to be listed as part of this parameter, so the newly defined SEI messages for omnidirectional media in ISO/IEC 23008-2 can be signalled. It is expected that both MTSI clients and MTSI gateways support RTP payload formats for VR support.

For most one-to-one video telephony and multi-party video conferencing scenarios, it is expected that support of the following omnidirectional video specific SEI messages would be sufficient:

1) the equirectangular projection SEI message,
2) the cubemap projection SEI message,
3) the sphere rotation SEI message, and
4) the region-wise packing SEI message.

For stereoscopic video support, in either one-to-one video telephony scenarios or multi-party video conferencing scenarios, support of a subset of the frame packing arrangement SEI message as in ISO/IEC 23090-2 is also needed.

Based on the above, an SDP framework for immersive video exchange needs to be developed to negotiate codec support, SEI messages for decoder rendering metadata, as well as RTP/RTCP signaling necessary for viewport dependent processing. These capabilities may be individually negotiated, but to simplify the SDP exchange and avoid fragmentation of capabilities it would be more preferable to specify one or more MTSI client profiles and develop the SDP framework based on these profiles. Such an example compact SDP negotiation framework is described below.

A new SDP attribute 3gpp_360video may be defined with the following ABNF:

3gpp_360video="a=3gpp_video:" [SP "VDP" SP "Stereo"]

A potential specification for the semantics of the above attribute and parameter is provided below. Unsupported parameters of the 3gpp_360video attribute may be ignored.

An MTSI terminal supporting the 360 video feature without using viewport-dependent processing (VDP) or stereoscopic video for video may support the following procedures:

when sending an SDP offer, the MTSI client includes the 3gpp_360video attribute in the media description for video in the SDP offer when sending an SDP answer, the MTSI client includes the 3gpp_360video attribute in the media description for video in the SDP answer if the 3gpp_360video attribute was received in an SDP offer after successful negotiation of the 3gpp_360video attribute in the SDP, for the video streams based on the HEVC codec, the MTSI clients exchange an RTP-based video stream containing an HEVC bitstream with omnidirectional video specific SEI messages as defined in ISO/IEC 23008-2 with the following characteristics:

OMAF video profiles specified in ISO/IEC 23090-2 are based on HEVC Main 10 Profile, Main Tier, Level 5.1 are supported.

exchange of the following SEI messages are supported:
(i) the equirectangular projection SEI message, (ii)

the cubemap projection SEI message, (iii) the sphere rotation SEI message, and (iv) the region-wise packing SEI message.

after successful negotiation of the 3gpp_360video attribute in the SDP, for the video streams based on the AVC codec, the MTSI clients exchange an RTP-based video stream containing an AVC bitstream with omnidirectional video specific SEI messages as defined in ISO/IEC 14496-10 with the following characteristics:

OMAF video profiles specified in ISO/IEC 23090-2 are based on AVC Progressive High Profile, Main Tier, Level 5.1 are supported.

exchange of the following SEI messages are supported: (i) the equirectangular projection SEI message, (ii) the cubemap projection SEI message, (iii) the sphere rotation SEI message, and (iv) the region-wise packing SEI message.

An MTSI terminal supporting the 360 video feature supporting use of viewport-dependent processing (VDP) would include the VDP parameter and further support the following procedures:

the RTCP feedback (FB) message described in clause 9.2 type to carry desired or requested viewport information during the RTP streaming of media (signalled from the MTSI receiver to the MTSI sender).

the new RTP header extension type described in clause 9.4 to carry actually transmitted viewport information during the RTP streaming of media (signalled from the MTSI sender to the MTSI receiver).

An MTSI terminal supporting the 360 video feature with stereoscopic video would include the Stereo parameter and additionally support frame packing arrangement SEI message as in ISO/IEC 23090-2 for HEVC and ISO/IEC 14496-10.

Some further considerations for potential solution for viewport-dependent processing are discussed next.

The following RTP/RTCP signalling may be defined to enable support for viewport-dependent processing:

1) A new RTCP feedback (FB) message type to carry desired or requested viewport information during the RTP transmission of media (signalled from the MTSI receiver to the MTSI sender).
2) A new SDP parameter on the RTCP-based ability to signal desired or requested viewport information during the IMS/SIP based capability negotiations.
3) A new RTP header extension type to carry actually transmitted viewport information during the RTP transmission of media (signalled from the MTSI sender to the MTSI receiver). Editor's Note: more work is needed to justify the need for this by explaining how the media receiver could use this viewport information
4) A new SDP parameter on the RTP-based ability to signal actually transmitted viewport information during the IMS/SIP based capability negotiations.

To realize these capabilities, an extension of the existing "Video Region of Interest (ROI)" feature defined in clauses 6.2.3.4 and 7.3.7 of TS 26.114 may be considered. The Video ROI feature of MTSI consists of signalling the currently requested region-of-interest (ROI) of the video on the receiver side to the sender for appropriate encoding and transmission. This MTSI feature may be extended with the definition of the following additional modes, based on new formats that provide Viewport indications using the spherical coordinate system:

'Viewport', in which the MTSI receiver determines a specific region on the sphere (i.e. desired viewport) and signals its spherical coordinates to the MTSI sender.

Additionally, a 'Sent Viewport' mode is defined in order for the MTSI sender to communicate the actually transmitted viewport information to the MTSI receiver as part of the sent RTP stream.

One difference of this viewport signaling modes is the use of the spherical coordinate system to describe the desired/sent viewport relevant in the case of immersive 360 video delivery over MTSI, instead of the 2D coordinates currently used as part of the current Video ROI feature in TS 26.114 which would be relevant in case of 2D video delivery over MTSI.

RTCP-based signaling of desired viewport Information will now be described.

The signalling of 'Viewport' requests may use RTCP feedback messages as specified in IETF 4585. The RTCP feedback message is identified by PT (payload type)=PSFB (206) which refers to payload-specific feedback message. FMT (feedback message type) may be set to the value '9' for ROI feedback messages. The IANA registration information for the FMT value for ROI is provided in Annex R.1 of TS 26.114. The RTCP feedback method may involve signalling of viewport information in both of the immediate feedback and early RTCP modes.

The FCI (feedback control information) format for Viewport may be as follows. The FCI may contain exactly one viewport. The signalled desired viewport information in the RTCP feedback message for 'Viewport' is composed of the following parameters (as aligned with OMAF):

Viewport_azimuth: Specifies the azimuth of the centre point of the sphere region corresponding to the desired viewport in units of $2^{-16}$ degrees relative to the global coordinate axes.

Viewport_elevation: Specifies the elevation of the centre point of the sphere region corresponding to the desired viewport in units of $2^{-16}$ degrees relative to the global coordinate axes.

Viewport_tilt: Specifies the tilt angle of the sphere region corresponding to the desired viewport, in units of $2^{-16}$ degrees, relative to the global coordinate axes.

Viewport_azimuth_range: Specifies the azimuth range of the sphere region corresponding to the desired viewport through the centre point of the sphere region in units of $2^{-16}$ degrees.

Viewport_elevation_range: Specifies the elevation range of the sphere region corresponding to the desired viewport through the centre point of the sphere region in units of $2^{-16}$ degrees.

Viewport_stereoscopic: Included if the desired viewport is indicated for stereoscopic video. Value 0 indicates monoscopic content, value 1 indicates that the sphere region is on the left view of a stereoscopic content, value 2 indicates the sphere region is on the right view of a stereoscopic content, and value 3 indicates that the sphere region is on both the left and right views.

The appropriate low-delay operation to timely delivery of the changes in viewport orientation from the remote participants is critical for high quality VR experience.

RTCP usually operates at the order of seconds. For example, the minimum transmission interval of RTCP is five seconds as stated in IETF RFC 3550. Although such constraints may be later removed, there is no real number to illustrate the minimum transmission interval. It is not clear if RTCP can achieve the timely delivery of the changes in viewport orientation from the remote participants. In general there is 5% rule for bandwidth usage for RTCP feedback. If there is no sufficient bandwidth for ITT4RT system operation, then RTCP feedback could be sent less frequently.

RTCP has fast modes such as immediate feedback and early RTCP feedback mode. However, the RTCP interval depends on the group size or number of remote participants. If the group size or number of remote participants increases, the RTCP interval could also increase to maintain the 5% of total bandwidth usage. When the group size or number of remote participants is small, immediate feedback can be used. When the group size or number of remote participants increases, early RTCP feedback mode can be used. As the group size or number of remote participants is large, the regular RTCP feedback mode should be used. Therefore, the interval of RTCP could be large when the number of remote participants is large. This could result in additional delay or latency.

Reliable and low-latency transport of RTCP feedback messages carrying viewport information is desirable. How to ensure this in MTSI is FFS, e.g., via potential QoS handling mechanisms or other means. Furthermore, certain restrictions on RTCP feedback message frequency may be imposed in order to control network overhead and server computational load, this is also FFS.

Next, some details of RTCP-based signaling of desired ROI will be described.

The parameters defined above are also applicable to RTCP feedback signalling for spherical 'Arbitrary ROI' for 360-degree video.

In case of spherical 'Predefined ROI', the MTSI receiver selects one of the offered ROIs pre-determined by the MTSI sender and signals the index of this ROI to the MTSI sender. In this mode, the MTSI receiver obtains the set of spherical coordinates for the pre-defined ROIs from the MTSI sender during the SDP capability negotiation as described in clause 9.6. The signalled desired ROI information in the RTCP feedback message for 'Pre-defined ROI' is composed of the following parameter:

Viewport_ID-identifies the pre-defined ROI selected by the MTSI receiver. The value of Viewport_ID can be acquired from the "a=predefined_roi" attributes that are indicated in the SDP offer-answer negotiation (see clause 9.4 below for the related SDP-based procedures).

The semantics of the proposed RTCP feedback messages is independent of the payload type.

Unlike 'Arbitrary ROI' and 'Pre-defined ROI' modes currently defined in MTSI which may be supported bi-directionally or uni-directionally depending on how clients negotiate to support the feature during SDP capability negotiations, the consideration for spherical 'Pre-defined ROI' and 'Arbitrary ROI' is constrained to be supported only uni-directionally based on the current 360 video delivery considerations over MTSI.

Spherical 'Arbitrary ROI' and 'Pre-defined ROI' may be supported at the same time. It is the MTSI receiver's decision to request an arbitrary ROI or one of the pre-defined ROIs at a given time. When pre-defined ROIs are offered by the MTSI sender, it is also the responsibility of the MTSI sender to detect and track any movements of these ROIs, e.g., the ROI could be a moving object, or moving person, etc., and refine the content encoding accordingly.

Next, some details of RTP-based signaling of actually transmitted viewport information will be provided.

'Sent Viewport' involves signalling from the MTSI sender to the MTSI receiver and this helps the MTSI receiver to know the actually sent viewport corresponding to the 360 video transmitted by the MTSI sender, i.e., which may or may not agree with the viewport requested by the MTSI receiver. In some settings, the actually transmitted viewport could be smaller than the desired viewport, e.g., due to network bandwidth limitations which may force the sender to only send a limited region in higher quality. In other scenarios, the actually transmitted viewport could be larger than the desired viewport, e.g., when the sender is able to predict the future viewports to be desired by the remote terminal.

If the sent viewport corresponds to an arbitrary viewport (indicated via the URN urn: 3gpp: viewport-sent-arbitrary in the SDP negotiation), the signalling can use RTP header extensions as specified in IETF 5285 and can carry the Viewport_azimuth, Viewport_elevation, Viewport_tilt, Viewport_azimuth_range, and Viewport_elevation_range parameters corresponding to the actually sent viewport.

If the sent viewport corresponds to one of the pre-defined viewports (indicated via the URN urn:3gpp:viewport-sent-predefined in the SDP negotiation), then the signalling can again use the RTP header extensions and can carry the Viewport_ID parameter corresponding to the actually sent pre-defined viewport.

Now, an example of SDP capability negotiation procedures for 'Viewport' is shown.

An MTSI client supporting 'Viewport' mode may offer 'Viewport' in SDP for all media streams containing 360 video, where 'Viewport' and associated viewport-dependent processing capabilities are desired. 'Viewport' may be offered by including the a=rtcp-fb attribute with the 'Viewport' type under the relevant media line scope. The 'Viewport' type in conjunction with the RTCP feedback method can be expressed with the following parameter: 3gpp-viewport. A wildcard payload type ("*") may be used to indicate that the RTCP feedback attribute for 'Viewport' signaling applies to all payload types. If several types of viewport signaling are supported and/or the same 'Viewport' may be specified for a subset of the payload types, several "a=rtcp-fb" lines can be used. Here is an example usage of this attribute to signal 'Viewport' relative to a media line based on the RTCP feedback method:

a=rtcp-fb:*3gpp-viewport

An MTSI client supporting 'Viewport' can also offer 'Sent Viewport' in SDP for all media streams containing 360 video. An MTSI sender accepting 'Viewport' can also accept an accompanying 'Sent Viewport' offer. 'Sent Viewport' can be offered by including the a=extmap attribute indicating the 'Sent Viewport' URN under the relevant media line scope. The 'Sent Viewport' URN can be: urn: 3gpp: viewport-sent. Here is an example usage of this URN to signal 'Sent Viewport' relative to a media line:

a=extmap:7 urn:3gpp:viewport-sent

The number 7 in the example may be replaced with any number in the range 1-14.

It should be noted that the above SDP offer-answer procedures are just described as examples, and more compact SDP-based capability negotiation procedures may instead be defined outside of the 'Video ROI' feature to specifically negotiate viewport dependent processing during MTSI-based delivery of 360 video. Nevertheless, the RTP/RTCP-based formats described above to signal desired/actual viewport information based on extensions of the current Video ROI signalling formats in TS 26.114 based on spherical coordinate representations can still be relevant as part of these more compact SDP negotiation procedures.

Now, an example of SDP capability negotiation procedures for ROI is shown.

An MTSI client supporting spherical 'Pre-defined ROI mode may offer 'Pre-defined ROI' in SDP for all media streams containing 360 video, where 'Pre-defined ROI' and associated ROI-dependent processing capabilities are desired. 'Pre-defined ROI' may be offered by including the a=rtcp-fb attribute with the 'Pre-defined ROI' type under the relevant media line scope. The 'Pre-defined ROI' type in conjunction with the RTCP feedback method can be expressed with the following parameter: 3gpp-roi-pre-defined. A wildcard payload type ("*") may be used to indicate that the RTCP feedback attribute for 'Pre-defined ROI' signaling applies to all payload types. If several types of ROI signaling are supported and/or the same 'Pre-defined ROI' can be specified for a subset of the payload types, several "a=rtcp-fb" lines can be used. Here is an example usage of this attribute to signal 'Pre-defined ROI' relative to a media line based on the RTCP feedback method:

a=rtcp-fb:* 3gpp-roi-predefined

The ABNF for rtcp-fb-val corresponding to the feedback types "3gpp-roi-arbitrary" and "3gpp-roi-predefined" is given as follows:

rtcp-fb-val=/"3gpp-roi-arbitrary"
    rtcp-fb-val=/"3gpp-roi-predefined"

An MTSI sender supporting the spherical 'Pre-defined ROI feature can offer detailed pre-defined ROI information in the initial offer-answer negotiation by carrying it in SDP. Pre-defined ROI can be offered by including the "a=predefined_roi" attribute under the relevant media line. The following parameters can be provided in the attribute for each pre-defined roi:

ROI_ID—identifies the offered pre-defined ROI.
    ROI_azimuth: Specifies the azimuth of the centre point of the sphere region corresponding to the offered pre-defined ROI in units of 2?16 degrees relative to the global coordinate axes.
    ROI_elevation: Specifies the elevation of the centre point of the sphere region corresponding to the offered pre-defined ROI in units of 2?16 degrees relative to the global coordinate axes.
    ROI_tilt: Specifies the tilt angle of the sphere region corresponding to the offered pre-defined ROI, in units of 2?16 degrees, relative to the global coordinate axes.
    ROI_azimuth_range: Specifies the azimuth range of the sphere region corresponding to the offered pre-defined ROI through the centre point of the sphere region in units of 2?16 degrees.
    ROI_elevation_range: Specifies the elevation range of the sphere region corresponding to the offered pre-defined ROI through the centre point of the sphere region in units of 2?16 degrees.
    Name-specifies the name of the offered pre-defined ROI.

In response to the SDP offer with the set of offered pre-defined ROI provided using the "a=predefined_roi" line(s), an MTSI client accepting 'Pre-defined ROI' can provide an SDP answer using the "a=predefined_ROI" line(s) containing the accepted set of pre-defined ROI. Such an SDP answer can also contain the "a=rtcp-fb:* 3gpp-roi" line. The accepted set of pre-defined ROI would be a subset of the offered set of pre-defined ROIs. Following the successful negotiation of 'Pre-defined ROI', the MTSI receiver uses the RTCP feedback method to request from the accepted set of pre-defined ROI and MTSI sender encodes the sent 360 video accordingly to provide the requested pre-defined ROI.

A new SDP offer-answer negotiation can be performed to modify the set of pre-defined ROI. The MTSI sender may update all the content of pre-defined ROIs, including the total number of pre-defined ROIs, and the spherical coordinates and name of each of the pre-defined ROIs.

In viewport dependent delivery, the Motion to High Quality (M2HQ) Delay is the time elapsed between the instant the user changes head orientation to a new position and the time the user receives content at high quality for the new head orientation. In order to minimize the M2HQdelay and consequently enhance the user experience, a receiver should be able to request additional margins at a higher quality around the viewport when the network conditions allow. FIG. 5a shows the viewport and margin areas in an equirectangular projected picture. The margin area may also be used for stabilizing the viewport when the receiving user is following the viewport orientation of another user, or when the receiving user is performing small head motion perturbations.

It should be possible to signal the extent of this margin area exactly (or as a minimum or maximum). The signaling may be done using SDP at the beginning of the session or during the session.

It may be possible for the sender to change the width of these margins during the session without receiver involvement, e.g., based on the quality of the network. However, the margin area should not exceed the maximum or be less than the minimum value set for it.

The margin area may be extended equally on all sides of the viewport or unevenly depending on i) general user behavior as determined through watching patterns ii) recent head motion signals or iii) nature of the content (e.g., room layout).

In the following, several embodiments will be described in the context of virtual reality (VR). VR content consumption is immersive. There are many scenarios which require the VR user to view or interact with content or information which is not germinating from the VR content. The present embodiments enable immersive content consumption on a device, when the content is being sent over the network. The present embodiments are applicable in 360-degree VR Conferencing. It is to be noted, however, that the invention is not limited to VR Conferencing. In fact, the different embodiments have applications in any environment where VR video streaming is performed.

The phrase along the bitstream (e.g. indicating along the bitstream) may be defined to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. For example, an indication along the bitstream may refer to metadata in a container file that encapsulates the bitstream.

Since the beginning of photography and cinematography, the most common type of image and video content has been captured by cameras with relatively narrow field of view and displayed as a rectangular scene on flat displays. Such content is referred as "flat content", or "flat image", or "flat video" in this application. The cameras are mainly directional, whereby they only capture a limited angular field of view (the field of view towards which they are directed). Such a flat video is output by a display device capable of displaying two-dimensional content.

More recently, new image and video capture devices have become available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output such as head-mounted displays, and other devices, allow a person to see the 360-degree visual content.

Available media file format standards include International Standards Organization (ISO) Base Media File Format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

High Efficiency Image File Format (HEIF) is a standard developed by the Moving Picture Experts Group (MPEG) for storage of images and image sequences. Among other things, the standard facilitates file encapsulation of data coded according to High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the following, term "omnidirectional" may refer to media content that may have greater spatial extent than a field-of-view of a device rendering the content. Omnidirectional content may, for example, cover substantially 360 degrees in the horizontal dimension and substantially 180 degrees in the vertical dimension, but omnidirectional may also refer to content covering less than 360 degree view in the horizontal direction and/or 180 degree view in the vertical direction.

A panoramic image covering a 360-degree field-of-view horizontally and a 180-degree field-of-view vertically can be represented by a sphere that has been mapped to a two-dimensional image plane using the equirectangular projection (ERP). In this case, the horizontal coordinate may be considered equivalent to a longitude, and the vertical coordinate may be considered equivalent to a latitude, with no transformation or scaling applied. In some cases, panoramic content with a 360-degree horizontal field-of-view, but with less than a 180-degree vertical field-of-view may be considered special cases of equirectangular projection, where the polar areas of the sphere have not been mapped onto the two-dimensional image plane. In some cases, panoramic content may have less than a 360-degree horizontal field-of-view and up to a 180-degree vertical field-of-view, while otherwise having the characteristics of an equirectangular projection format.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3DoF (3 Degrees of Freedom) content (where the viewer is located at the centre of a unit sphere and has three degrees of freedom (Yaw-Pitch-Roll). The following phase standardization (MPEG-I Phase 1b) is close to completion. This phase is expected to enable multiple 3DoF and 3DoF+ content consumption with user interaction and means to optimize the Viewport Dependent Streaming (VDS) operations and bandwidth management.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV).

The 360-degree space may be divided into a discrete set of viewports, each separated by a given distance (e.g., expressed in degrees), so that the omnidirectional space can be imagined as a map of overlapping viewports, and the viewport is switched discretely as the user changes his/her orientation while watching content with a head-mounted display (HMD). When the overlapping between viewports is reduced to zero, the viewports can be imagined as adjacent non-overlapping tiles within the 360-degrees space. The H.265 video codec implements the concept of tiles which may be used to realize this scenario (both overlapping and not).

Figure 3:
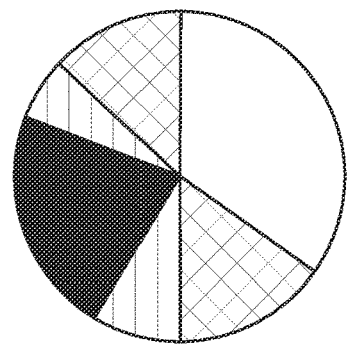
FIG. 3 presents an example of a 360° sphere from top divided into a viewport, margins and background areas.

A viewport dependency can be achieved either by having two quality areas: foreground (viewport) and background, or also having a third category: a margin or margins around the viewport. FIG. 3 presents a 360° sphere from top. The black area represents the current viewport, the hashed area represents the margin due to viewport not matching with tile boundaries, the cross-hatched area represents the margins with possibly lower quality than viewport, and the white area represents the background area, with further lower video quality, hence occupying the least bandwidth.

When streaming VR video, a subset of 360-degree video content covering the viewport (i.e., the current view orientation) may be transmitted at the best quality/resolution, while the remaining of 360-degree video may be transmitted at a lower quality/resolution. This is what characterizes a VDS system, as opposed to a Viewport Independent Streaming system, where the omnidirectional video is streamed at high quality in all directions.

The Omnidirectional Media Format (OMAF) standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following: A recommended viewport per the director's cut, e.g., a viewport suggested according to the creative intent of the content author or content provider.

The omnidirectional media comprises image data (Bi) and audio data (Ba), which are processed separately. In image stitching, rotation, projection and region-wise packing, the images/video of the source media and provided as input (Bi) are stitched to generate a sphere picture on a unit sphere per the global coordinate axes. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent picture on one projected picture. Rectangular region-wise packing can then be applied to obtain a packed picture from the projected picture. The packed pictures (D) are then provided for video and image encoding to result in encoded image (Ei) and/or encoded video stream (Ev). The audio of the source media is provided as input (Ba) to audio encoding that provides as an encoded audio (Ea). The encoded data (Ei, Ev, Ea) are then encapsulated into file for playback (F) and delivery (i.e. streaming) (Fs).

Figure 1:
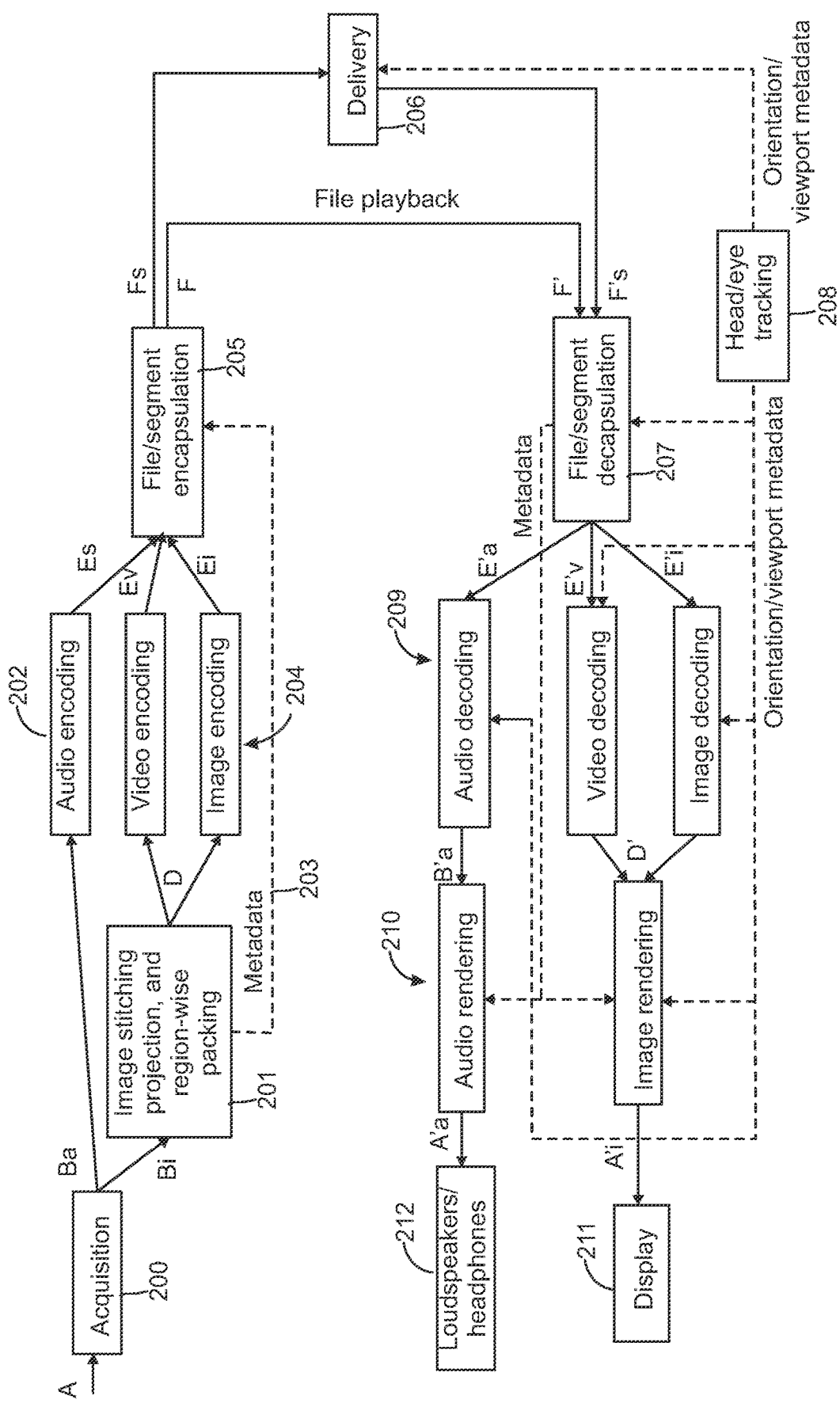
FIG. 1 shows an example of an OMAF end-to-end system.

FIG. 1 illustrates the OMAF system architecture. The system can be situated in a video camera, or in a network server, for example. As shown in FIG. 1, an omnidirectional media (A) is acquired. If the OMAF system is part of the video source, the omnidirectional media (A) is acquired from the camera means. If the OMAF system is in a network server, the omnidirectional media (A) is acquired from a video source over network.

A real-world audio-visual scene (A) may be captured 200 by audio sensors as well as a set of cameras or a camera device with multiple lenses and sensors. The acquisition results in a set of digital image/video (Bi) and audio (Ba) signals. The cameras/lenses may cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals may conform to one of the loudspeaker layouts defined in CICP (Coding-Independent Code-Points). In an omnidirectional media application, the loudspeaker layout signals of the rendered immersive audio program may be binauralized for presentation via headphones.

The images (Bi) of the same time instance are stitched, projected, and mapped 201 onto a packed picture (D).

For monoscopic 360-degree video, the input images of one time instance may be stitched to generate a projected picture representing one view. An example of image stitching, projection, and region-wise packing process for monoscopic content is illustrated with FIG. 2*a*. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected picture. There may be a pre-defined set of representation formats of the projected picture, including for example an equirectangular projection (ERP) format and a cube map projection (CMP) format. It may be considered that the projected picture covers the entire sphere.

Optionally, a region-wise packing is then applied to map the projected picture (C) onto a packed picture (D). If the region-wise packing is not applied, the packed picture is identical to the projected picture, and this picture is given as input to image/video encoding. Otherwise, regions of the projected picture (C) are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

Figure 2A:
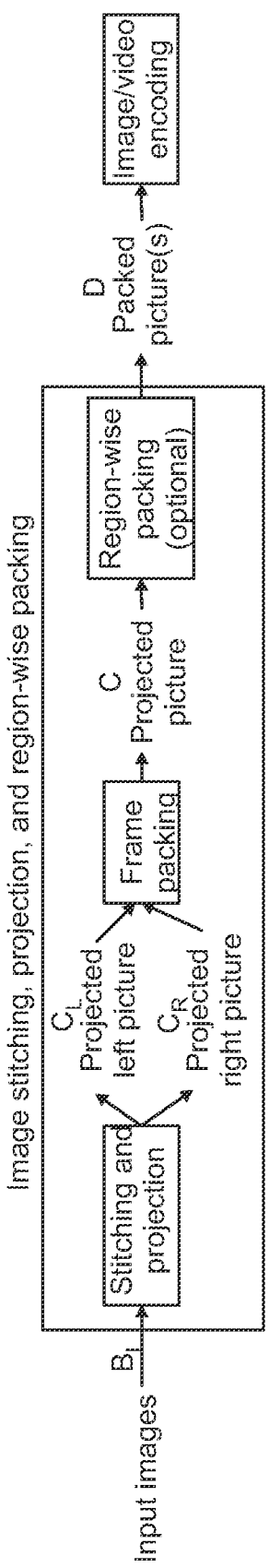
FIG. 2a shows an example of image stitching, projection and region-wise packing.

In the case of stereoscopic 360-degree video, as shown in an example of FIG. 2*a*, the input images of one time instance are stitched to generate a projected picture representing two views (CL, CR), one for each eye. Both views (CL, CR) can be mapped onto the same packed picture (D) and encoded by a traditional 2D video encoder. Alternatively, each view of the projected picture can be mapped to its own packed picture, in which case the image stitching, projection, and region-wise packing is performed as illustrated in FIG. 2*a*. A sequence of packed pictures of either the left view or the right view can be independently coded or, when using a multiview video encoder, predicted from the other view.

An example of image stitching, projection, and region-wise packing process for stereoscopic content where both views are mapped onto the same packed picture, as shown in FIG. 1 is described next in more detailed manner. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

360-degree panoramic content (i.e., images and video) cover horizontally (up to) the full 360-degree field-of-view around the capturing position of an imaging device. The vertical field-of-view may vary and can be e.g. 180 degrees.

Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic content may have less than 360-degree horizontal field-of-view and up to 180-degree vertical field-of-view, while otherwise have the characteristics of equirectangular projection format.

Figure 2B:
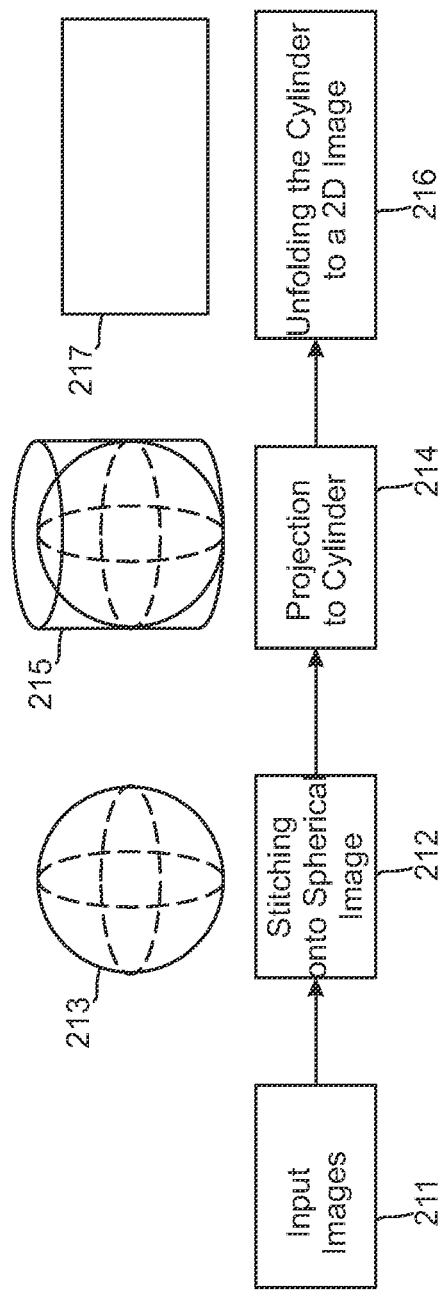
FIG. 2b shows an example of a process of forming a monoscopic equirectangular panorama picture.

An example of the process of forming a monoscopic equirectangular panorama picture is illustrated in FIG. 2b. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected picture. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

In 360-degree systems, a coordinate system may be defined through orthogonal coordinate axes, such as X (lateral), Y (vertical, pointing upwards), and Z (back-to-front axis, pointing outwards). Rotations around the axes may be defined and may be referred to as yaw, pitch, and roll. Yaw may be defined to rotate around the Y axis, pitch around the X axis, and roll around the Z axis. Rotations may be defined to be extrinsic, i.e., around the X, Y, and Z fixed reference axes. The angles may be defined to increase clockwise when looking from the origin towards the positive end of an axis. The coordinate system specified can be used for defining the sphere coordinates, which may be referred to as azimuth ($\phi$) and elevation ($\theta$).

Referring again to FIG. 1, the OMAF allows the omission of image stitching, projection, and region-wise packing and encode the image/video data in their captured format. In this case, images (D) are considered the same as images (Bi) and a limited number of fisheye images per time instance are encoded.

For audio, the stitching process is not needed, since the captured signals are inherently immersive and omnidirectional.

The stitched images (D) are encoded 204 as coded images (Ei) or a coded video bitstream (Ev). The captured audio (Ba) is encoded 202 as an audio bitstream (Ea). The coded images, video, and/or audio are then composed 205 into a media file for file playback (F) or a sequence of an initialization segment and media segments for streaming (Fs), according to a particular media container file format. In this specification, the media container file format is the ISO base media file format. The file encapsulator 205 also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed picture format, e.g. from a projected picture to a packed picture, as described earlier. The region-wise mapping information may for example comprise for each mapped region a source rectangle (a.k.a. projected region) in the projected picture and a destination rectangle (a.k.a. packed region) in the packed picture, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

The segments (Fs) may be delivered 206 using a delivery mechanism to a player.

The file that the file encapsulator outputs (F) is identical to the file that the file decapsulator inputs (F'). A file decapsulator 207 processes the file (F') or the received segments (F's) and extracts the coded bitstreams (E'a, E'v, and/or E'i) and parses the metadata. The audio, video, and/or images are then decoded 208 into decoded signals (B'a for audio, and D' for images/video). The decoded packed pictures (D') are projected 210 onto the screen of a head-mounted display or any other display device 211 based on the current viewing orientation or viewport and the projection, spherical coverage, projection structure orientation, and region-wise packing metadata parsed from the file.

Likewise, decoded audio (B'a) is rendered 210, e.g. through headphones 212, according to the current viewing orientation. The current viewing orientation is determined by the head tracking and possibly also eye tracking functionality 208. Besides being used by the renderer 210 to render the appropriate part of decoded video and audio signals, the current viewing orientation may also be used the video and audio decoders 209 for decoding optimization.

The process described above is applicable to both live and on-demand use cases.

At any point of time, a video rendered by an application on a HMD or on another display device renders a portion of the 360-degree video. This portion may be defined as a viewport. A viewport may be understood as a window on the 360-degree world represented in the omnidirectional video displayed via a rendering display.

According to another definition, a viewport may be defined as a part of the spherical video that is currently displayed. A viewport may be characterized by horizontal and vertical field-of-views (FOV or FoV).

A viewport may further be defined as a region of omnidirectional image or video suitable for display and viewing by the user. A current viewport (which may be sometimes referred simply as a viewport) may be defined as the part of the spherical video that is currently displayed and hence is viewable by the user(s) i.e. the point or space from which the user views the scene; it usually corresponds to a camera position. Slight head motion may not imply a different viewpoint. A viewing position may be defined as the position within a viewing space from which the user views the scene. A viewing space may be defined as a 3D space of viewing positions within which rendering of image and video is enabled and VR experience is valid.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), wherein each may contain a few seconds of multimedia data. A Cluster comprises BlockGroup elements, which in turn comprise Block Elements. A Cues Element comprises metadata which may assist in random access or seeking and may include file pointers or respective timestamps for seek points.

A transmission channel or a communication channel or a channel may refer to either a physical transmission medium, such as a wire, or to a logical connection over a multiplexed medium.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver device may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Figure 4:
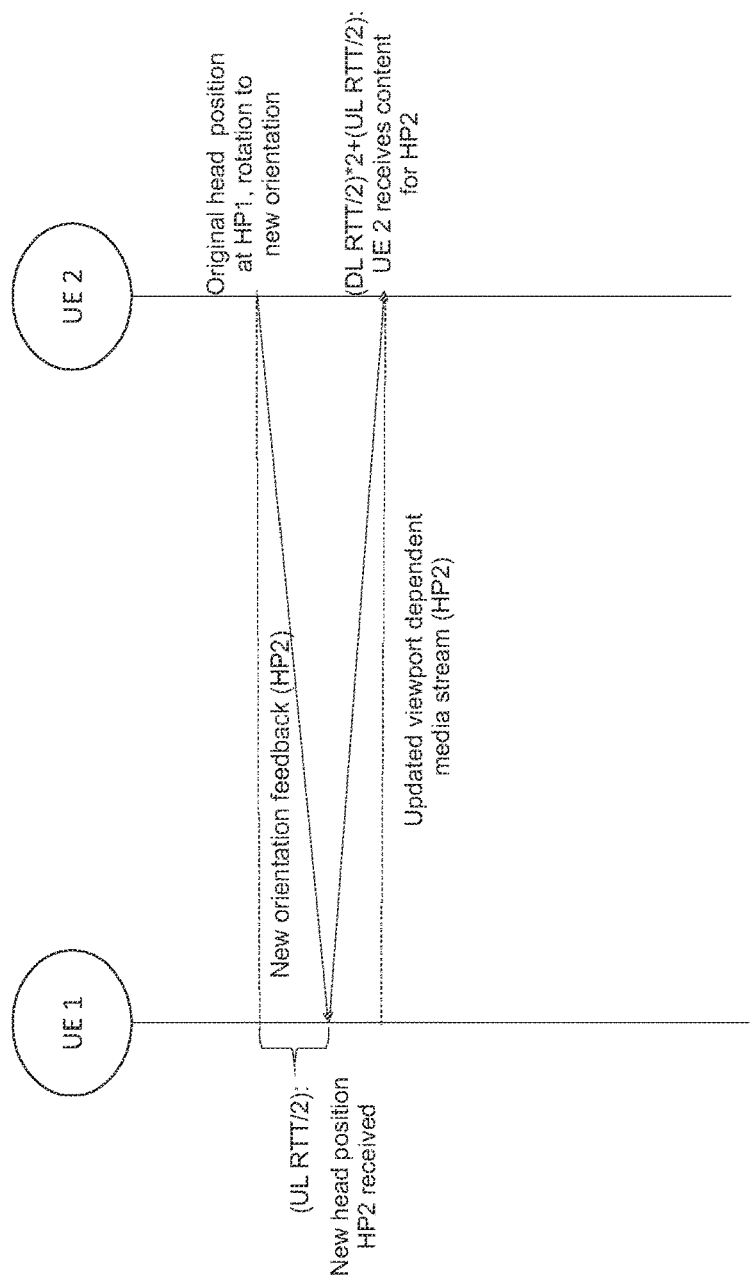
FIG. 4 presents a camera-to-eye delay in viewport dependent omnidirectional delivery for video calls.

A limited field-of-view video conference may have a camera-to-eye delay, which is about half of a round trip time (RTT) between a sender device (a transmitting user equipment, UE) and a receiver device (a receiving UE). A delay, about the round trip time (1.0*RTT delay), may be obtained as follows, as illustrated in FIG. 4. A receiving UE performs head motion from original position HP1 to a new position HP2, sends information of the new position HP2 to the transmitting UE and receives the new content related to the new position HP2 at about 1×RTT. This is something important for overall conversational experience and different from the limited field-of-view of MTSI (Multimedia Telephony Service for IP multimedia subsystem, IMS) which is about 0.5*RTT for limited field-of-view content, hence the need to leverage viewport margin. However, this margin may result in additional complexity in rate adaptation.

Consequently, viewport dependent delivery in ITT4RT should be highly optimized in terms of receiver or sender intent (based on the type of content) in order to minimize the impact of additional margins whenever possible. A content or purpose agnostic rate adaptation may lead to suboptimal user experience. For example, in some scenarios, consistent quality might be more important whereas in other scenarios highest possible quality might be preferred. When viewing omnidirectional content on a large 2D display, a consistent quality may provide a better subjective viewing experience compared to a mix of high quality and low quality when the viewport is changed. In a contrast scenario, observing fine details of the visual scene might be important, requiring the highest possible quality, even if for a limited field of view.

In the following, a method for content dependent rate adaptation scheme will be described which considers the preference for obtaining high quality versus head-motion invariant or consistent quality. In the following, these two terms invariant quality and consistent quality are used interchangeably. In accordance with an embodiment, consistent quality is achieved by signaling a quality trade-off attribute for viewport dependent omnidirectional conversational video transmission. The trade-off attribute indicates a preference between high-quality video in the viewport versus consistent quality during head-motion. In accordance with an embodiment, the high-quality scheme is applied by reducing viewport margins whereas the consistent quality is applied by reducing the quality of the viewport while maintaining the margins.

The quality trade-off scheme may be used in addition to real-time feedback from the receiver. For example, a preference for consistent quality may be indicated with a minimum limit for margins to the sender. However, if the receiver indicates high delay in viewport updates using motion-to-high-quality delay (M2HQ) values over RTCP, the margins may be increased further during operation. Similarly a high-quality trade-off may be selected with a maximum margin limit, however, a low M2HQ value over RTCP may be used to further decrease margins during operation.

In an embodiment, the trade-off between high quality and consistent quality comprises multiple options instead of a binary indication. The steps comprise at least the following options. One option is to select high quality instead of consistent quality; another option is to select consistent quality instead of high quality; a third option is to select high quality with specific margin(s); a fourth option is to select automatic adjustment of consistent vs. high quality based on real time control protocol (RTCP) feedback. There may also be options to select high quality with directional extended margins based on object tracking, audio events or head motion. In the latter, margins based on head motion option, the margin may be extended in the direction of the head motion.

In an embodiment for MTSI or ITT4RT context, a new attribute a-quality-trade-off: X is included in the offer to indicate the support for the quality-trade-off feature in the sender device. The desired quality-trade-off value is retained in the answer depending on the receiver device preference. The quality trade off can also be implemented as an additional argument to the 3gpp_360video attribute in SDP.

3gpp_360video="a=3gpp_video:" [SP "VDP" SP "Stereo"] can be extended in the following manner.

With textual codes for different tradeoff values:
3gpp_360video="a=3gpp_video:" [SP "VDP" SP "Stereo" SP "HQ/CQ"] where HQ=High Quality is the chosen mode, CQ=Consistent Quality is the chosen mode.

The following is an example with numerical tradeoff values:
3gpp_360video="a=3gpp_video:" [SP "VDP" SP "Stereo" SP "qualit-tradeoff-value"]

In yet another embodiment, the receiver device can send an RTCP feedback message during an on-going SIP session to discontinue or resume the margins used for high quality or consistent quality schemes.

In another embodiment, the sender device may offer application preference-based options under quality-trade-off, where the rate adaptation scheme is optimized for these specific scenarios, e.g., conference, demo/presentation, 2D-display, etc.

Rate adaptation is typically done by reducing the bitrate as a response to increased delay. In viewport dependent conversational video, rate adaptation can be performed using the following options:

Reduce the field of view or region of a projected (e.g., ERP) omnidirectional video that is transmitted Reduce the quality for the "high quality region" (this is assuming high quality region delivery corresponding to user's viewing orientation and low quality for the other regions)

Depending on the content as well as receiver preferences, different methods could be used to implement this:

Rate adaptation quality trade-off preference is signaled during session negotiation (e.g., SIP/SDP offer-answer model)

Sender indicates the availability of such a feature in the sender UE to the receiver UE.

The receiver UE responds based on the preference and capability (e.g., 2D display, HMD, etc.)

The sender UE can select the bitrate allocation to the different spatial regions of the omnidirectional video. FIGS. 5a and 5b illustrate an example of the high quality versus consistent quality trade-off. In FIG. 5a a viewport is depicted as a hashed rectangle and some example margins around the viewport are depicted as rectangles of different sizes. FIG. 5c illustrates the effect of quality reduction to the bitrate, in accordance with an example.

The invention can be implemented in the following manner:

Viewing orientation traversal is directly proportional to the duration and speed of the head motion.

The traversal, T (in degrees)=S*DT, where DT is traversal duration and S is the speed of the head, supposing linear motion.

Viewport width=$V_W$

The equal margin on each side=$(1/2)*(HQ_W-V_W)$

Traversal threshold, is defined as the time before the viewport extends outside the high-quality region: $T_{TH}$ For the high-quality scheme, the margins are reduced to reduce the bitrate. Consequently, reduction of $T_{TH}$ increases the probability of breaching the high-quality region. Thus, this approach is more suited for scenes where high quality is more important in certain regions (e.g., user's viewport or even subset of the viewport).

For the consistent quality scheme, the quality of the entire high quality region or a subset of the high quality region is reduced. This may lead to consistent experience without fluctuations. The default margins can be set by the sender device which can be modified by the receiver device if desired.

In an embodiment of the implementation, different levels of transition between high quality scheme and consistent quality scheme can be implemented. These are indicated by the different values of the quality-trade-off attribute for each of the viewport dependent omnidirectional video media lines.

Figure 6A:
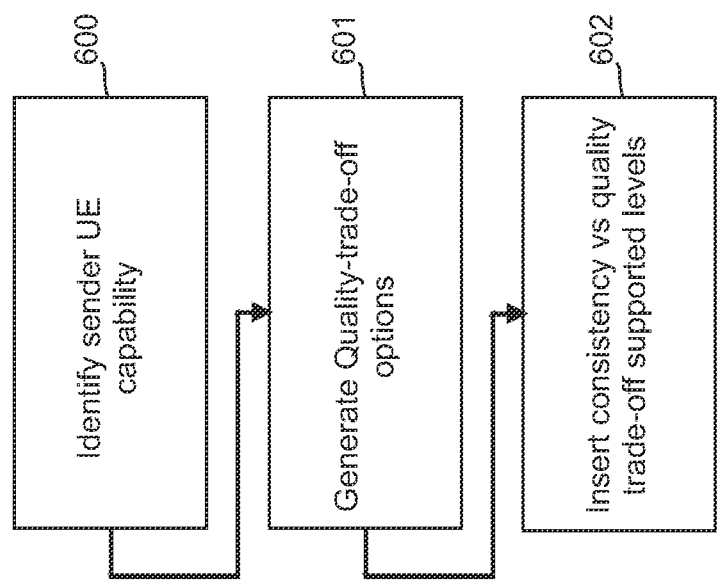
FIG. 6a shows sender device operation, in accordance with an embodiment.
Figure 6B:
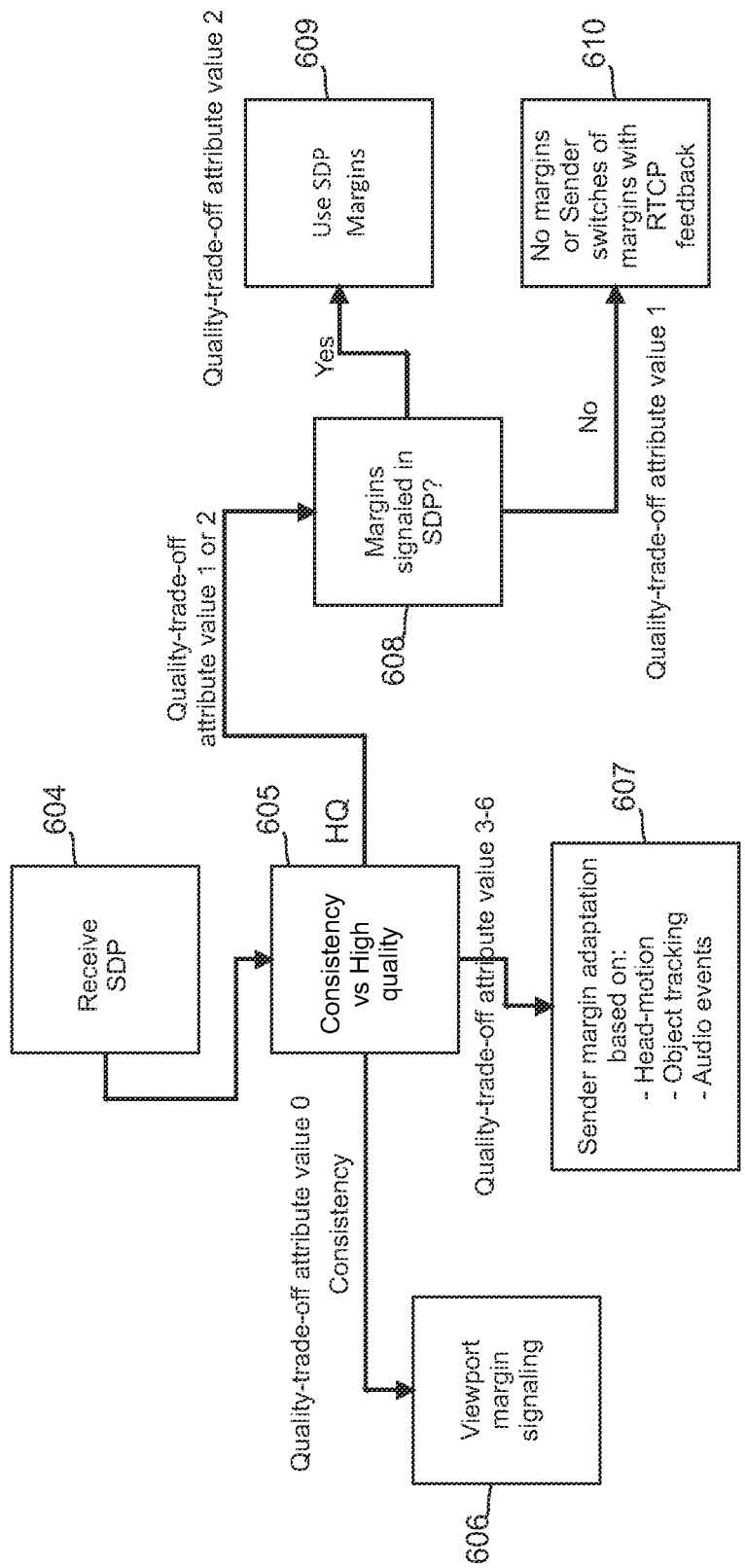
FIG. 6b shows receiver device operation, in accordance with an embodiment.

The flow chart describing the use of quality-trade-off signaling is described in FIGS. 6a and 6b. FIG. 6a illustrates a rate adaptation scheme selection operation in a sender device, in accordance with an embodiment. The sender device identifies capabilities it has regarding rate adaptation (block 600 in FIG. 6a). On the basis of the identification the sender device generates 601 quality trade off options and inserts 602 information of consistency vs quality trade off supported levels into a response to a receiver device.

FIG. 6b illustrates a rate adaptation scheme selection operation in a receiver device, in accordance with an embodiment. The receiver device receives the response (block 604 in FIG. 6*b*) and examines 605 the received information regarding consistency vs quality trade off supported level or levels. If the received information reveals consistency (quality-trade-off attribute=0), viewport margin signaling is performed 606. If the received information reveals high quality and that the margin adaptation is based on head tracking, object tracking or audio events (quality-trade-off attribute=3, 4, 5 or 6), the receiver device deduces 607 that the margin adaptation is based on head tracking, object tracking or audio events. If the received information reveals high quality and margins are signaled in SDP (block 608), the receiver device uses 609 SDP margins. If the received information reveals maximise quality with no or minimal margins, the receiver device deduces 610 that no margins will be used or that the sender switches off margins with RTCP feedback.

In the following, session negotiation examples are presented which utilize the different options available with the quality-trade-off attribute.

The signaling can be performed via the IETF SDP (Session Description Protocol), which is a format for describing streaming media communications parameters. The SDP may be used in conjunction with RTP, RTSP, or SIP. The syntax of some SDP fields are given below, as an example. The sender device comprises a list of all viewport control options it supports in the SDP Offer and the receiver device will include one it wishes to receive in the SDP response (SDP Answer). The sender device and the receiver device may negotiate and renegotiate the control options at the beginning and during the session. Other transport protocols can be used to transmit such information.

In the following examples the quality-trade-off parameter may have the following values and semantics, but in practical implementations also other values and semantics may be used. The value "0" indicates to maximise consistent quality (e.g., large margin); the value "1" indicates to maximise quality (e.g., no margin or minimal margin); the value "2" indicates to use high quality with margins indicated by a margin attribute; the value "3" indicates to use high quality with margins indicated by a receiver device; the value "4" indicates to use high quality with directional margins based on sender selected object tracking; the value "5" indicates to use high quality with directional margins based on sender selected audio events; the value "6" indicates to use high quality with directional margins based on user head motion; and the value "*" indicates that any value is available. The first example below illustrates a scenario where the SDP offer indicates "all possible" methods of quality-trade-off by setting the value of the quality-trade-off to "*". The receiver responds with the same attribute including the "*" which indicates all of the possible values are supported by the receiver device as well.

Example 1

SDP Offer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99 packetization-mode=0; profile-level-id=42e00c; \sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:* ccm fir
  a=rtcp-fb:* ccm tmmbr
  a=quality-trade-off:*
SDP Answer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99 packetization-mode=0; profile-level-id=42e00c; \ sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:* ccm fir
  a=rtcp-fb:* ccm tmmbr
  a=quality-trade-off:*

The second example below illustrates a scenario where the SDP offer indicates "all possible" methods of quality-trade-off by setting the value of the quality-trade-off to "*". The receiver device chooses maximize quality and responds with setting the value of the quality-trade-off parameter to 1, which in this example indicates the maximum quality.

Example 2

SDP Offer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99 packetization-mode=0; profile-level-id=42e00c; 1 sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:* ccm fir
  a=rtcp-fb:* ccm tmmbr
  a=quality-trade-off:*
SDP Answer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99 packetization-mode=0; profile-level-id=42e00c; 1 sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:* ccm fir
  a=rtcp-fb:* ccm tmmbr
  a=quality-trade-off:1

In the third example below a scenario is illustrated where the SDP offer indicates several methods of the quality-trade-off available by the sender device providing a plurality of values for the quality-trade-off parameter. In this example those values are 0, 1, 2 and 3. The receiver device chooses maximize consistent quality and responds with setting the value of the quality-trade-off parameter to 0. Only the relevant attribute is retained in the answer.

Example 3

SDP Offer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99    packetization-mode=0;    profile-level-id=42e00c; 1 sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:* ccm fir
  a=rtcp-fb:* ccm tmmbr
  a=quality-trade-off:0
  a=quality-trade-off:1
  a=quality-trade-off:2
  a=quality-trade-off:3
SDP Answer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99    packetization-mode=0;    profile-level-id=42e00c; 1 sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:*
  ccm fir
  a=rtcp-fb:* ccm tmmbr
  a=quality-trade-off:0

In the fourth example below a scenario is illustrated where the SDP offer indicates several methods of the quality-trade-off available by the sender device providing a plurality of values for the quality-trade-off parameter and suggestion of the horizontal and vertical margins. In this example the quality-trade-off parameter values are 0, 1, 2 and 3. In this example, the margin-limit attribute is used indicating a MAX L+R Margin (maximum horizontal margin) of 20 degrees and MAX T+B Margin (maximum vertical margin) of 10 degrees. Due to the presence of margin attribute, the receiver UE utilizes the quality-trade-off-value 2, i.e. to use high quality with margins indicated by the margin attributes.

Example 4

SDP Offer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99    packetization-mode=0;    profile-level-id=42e00c; 1 sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:* ccm fir
  a=rtcp-fb:* ccm tmmbr
  a=margin-horizontal: 20 deg
  a=margin-vertical: 10 deg
  a=quality-trade-off:0
  a=quality-trade-off:1
  a=quality-trade-off:2
  a=quality-trade-off:3
SDP Answer
  m=video 49154 RTP/AVP 99
  a=tcap:1 RTP/AVPF
  a=pcfg:1 t=1
  b=AS:315
  b=RS:0
  b=RR:2500
  a=rtpmap:99 H264/90000
  a=fmtp:99    packetization-mode=0;    profile-level-id=42e00c; 1 sprop-parameter-sets=J0LgDJWgUH6Af1A=, KM46gA==
  a=rtcp-fb:* trr-int 5000
  a=rtcp-fb:* nack
  a=rtcp-fb:* nack pli
  a=rtcp-fb:* ccm fir
  a=rtcp-fb:* ccm tmmbr
  a=margin-horizontal: 20 deg
  a=margin-vertical: 10 deg
  a=quality-trade-off:2

There are different scenarios where consistent quality or high-quality viewport may be the preferred. Some beneficial scenarios are provided below.

The consistent-quality viewport scheme may provide minimal motion to quality latency. The viewport margin may be directly proportional to end-to-end (E2E) latency, which is approximately 1.0*RTT.

The consistent-quality viewport scheme is usable, for example, when viewing omnidirectional video on large displays. It is also suitable for scenes with objects of interest within small field of view, music concerts or any social events. The consistent-quality viewport scheme is also usable in such sports events in which the area of interest has a field of view greater than the viewport (e.g. badminton or table tennis) and in events in which frequent pannings are expected.

The high-quality viewport scheme may provide higher motion to quality latency and can be usable, for example, with omnidirectional videos having visual content with many texture, text or other such details which are important. For example, showing the details of a scene in a workshop with description posters, museum, etc. The high-quality viewport scheme may also be usable with large exhibition areas with objects of interest spread with large angular separation.

Figure 7C:
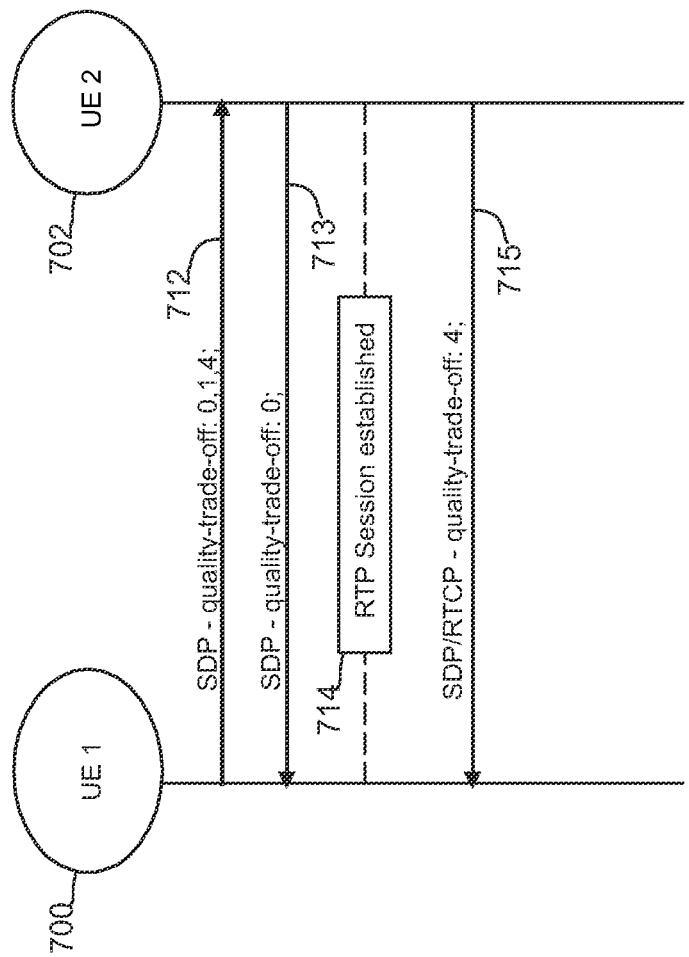

In the following, signaling flows of some example scenarios are described with reference to FIGS. 7a-7c. Signaling of the quality-trade-off may be used by the sender UE 700 to indicate to a Media Resource Function/a Media Control Unit (MRF/MCU) 701 the type of operation to use. An example signaling flow of such a scenario is shown in FIG. 7a. The receiver UE 702 sends 703 an SDP message to the MRF/MCU 701. The message includes the quality-trade-off parameter, which in this example has the value "*" i.e. any quality-trade-off is available in the receiver device 702. The MRF/MCU 701 forwards 704 the message to the sender device 700. The sender device 700 selects the consistency and margin limits 20, 6 and sends 705 as a reply the SDP message including the quality-trade-off parameter and margin information to the MRF/MCU 701. The MRF/MCU 701 forwards 706 the reply to the receiver device 702.

In another embodiment, the sender may offer several options and the receiver UE 702 is then able to choose one, as shown in FIG. 7b. The receiver UE 702 sends 707 a SDP message to the MRF/MCU 701. The message includes the quality-trade-off parameter, which in this example has the value "*" i.e. any quality-trade-off is available in the receiver device 702. The MRF/MCU 701 forwards 708 the message to the sender device 700. The sender device 700 selects several options 0, 1, 2 and 5 for the consistency and sets margin limits 20, 6 and sends 709 as a reply the SDP message including the quality-trade-off parameters and margin information to the MRF/MCU 701. The MRF/MCU 701 forwards 710 the reply to the receiver device 702. The receiver device 702 selects among the several options of the quality-trade-off parameters one which the receiver device 702 supports, in this example 5, and informs this to the MRF/MCU 701 by sending 711 the selected parameter in an SDP message. It should be noted here that the receiver device 702 may support more than one of the quality-trade-off options, wherein the receiver device 702 may determine which one is appropriate and selects that option.

In yet another embodiment, the quality-trade-off attribute is used by the sender device 700 to indicate 712 capability and the receiver device 702 picks the desired value based on user preference and informs 713 this to the sender device 700, as shown in FIG. 7c. Hence, the RTP session may be established 714. The receiver may wish to change the parameter during the session, which can be done using RTCP/SDP as shown in FIG. 7c (the arrow 715).

In yet another embodiment, the MRF/MCU is not acting as a signaling forwarder, but decides on the type of operation to use regarding quality trade off and margin limits. This happens when the signaling for viewport dependent operations is limited between receiver(s) and MRF/MCU.

In the following, some embodiments for streamable 360-degree event, such as a 360-degree conference, teleconference, telepresence, are discussed. However, in addition to the 360-degree conference, the embodiments are suitable for other VR streaming solutions as well (omnidirectional video delivery in covering point to point and multiparty conversational applications). FIGS. 8a-8c represent various scenarios for a 360-degree teleconference. A 360-degree conference can be a live meeting which is streamed to receiver device(s) by the sender, wherein the sender is a video source, such as a 360-degree (i.e. omnidirectional) camera, or a system being operatively connected to a video source or comprising means to record video. The streamable content from the sender to the receiver comprises at least video and audio. The purpose of the sender is to stream video being recorded forward to receiver device(s). The sender may also comprise means for receiving at least audio data from receiver device(s), and output the received audio data to the participants of the streamable event.

In FIGS. 8a-8c a group of participants is having a meeting in a conference room. The conference room can be considered as a virtual conference system A with physical elements (i.e. camera 820, view screen 810, physical participants) being able to share content to and to receive data from remote participants. As mentioned, the virtual conference system A comprises at least a 360-degree (i.e. omnidirectional) camera 820 and a view screen 810. The meeting is also participated by two remote participants B, C through a conference call. Physical participants of the virtual conference system A use the view screen 810 to display a shared presentation and/or video streams coming from the remote participants B, C. One of the remote participants B is using a head mounted display for having a 360-degree view to conference content and a camera that captures his/her video. One of the remote participants C uses a mobile phone to access the conference. The mobile phone is able to show a 360-degree video on the conference and to capture his/her video.

In the example of FIG. 8a, the conference call is set up without any media-aware network elements. Both remote participants B, C send information about their viewport orientation to the virtual conference system A, which in turn sends them a viewport-dependent video stream from the 360-degree camera 820.

In the example of FIG. 8b, the conference call is set up using a network function, which may be performed by either a Media Resource Function (MRF) or a Media Control Unit (MCU) 701. In this example, the MRF/MCU 701 receives a viewport-independent stream from the virtual conference system A. Both remote participants B, C send viewport orientation information to the MRF/MCU 701 and receive viewport-dependents streams from it. The A/V channel for conversational non-immersive content may also go through the MRF/MCU 701, as shown in FIG. 8b. The example of FIG. 8b aims to enable immersive experience for remote participants B, C joining the teleconference with two-way audio and one-way immersive video.

In the example of FIG. 8c, a virtual conference system for multiple conference rooms X are sending 360-degree video to an MRF/MCU 701. The rooms may choose to receive 2D video streams from other participants including one of the other rooms, which is displayed on the view screen 810 in the room. The remote participants B, C can choose to view any one or none of the available 360-degree videos from the multiple rooms. Switching from one room to another may be triggered manually, or using other mechanisms, such as viewing direction or dominant speaker. The MRF/MCU 701 may signal to pause the receiving 360-degree video from any of the rooms that do not currently have any active viewers.

In some embodiments, the 360-degree conference can be completely virtual, where all the meeting participants are remote participants, i.e. receiver devices connecting to the conference via a network, and where the sender is a computer generating a virtual representation of the virtual conference and the remote participants.

Figure 9:
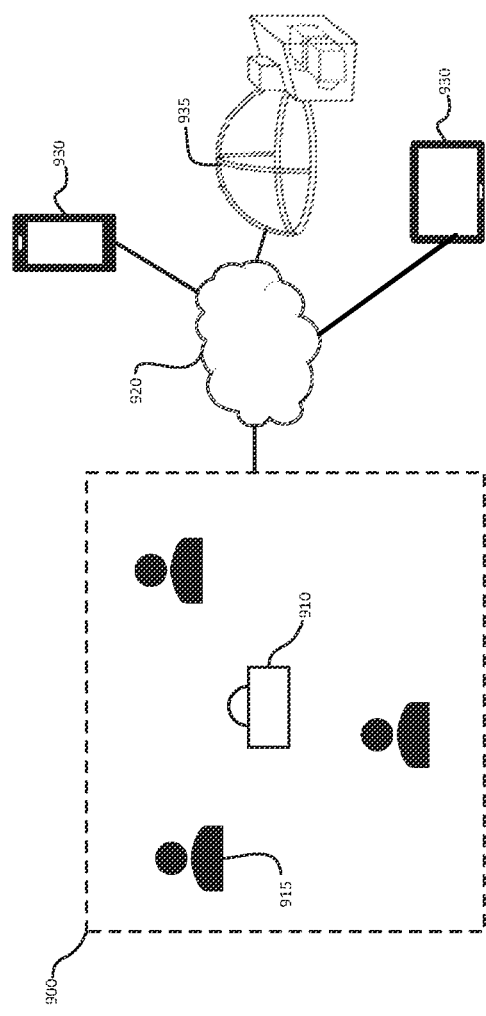
FIG. 9 shows an example of a teleconference setup.

FIG. 9 illustrates a further example of a set-up for 360-degree conference 900. In this example, a 360-degree conference 900 comprises at least one sender, such as a 360-degree video system 910 recording the conference. In addition, the 360-degree conference 900 comprises not only the live participants 915, but also one or more remote participants with receiver devices 930, 935 "participating" the conference by establishing a connection e.g. via a network 920 to the conference system which makes it possible to watch the 360-degree video captured by the 360-degree video system 910. In the following, the devices 930, 935 of the remote participants are referred to as "receiver devices" to emphasize their role as a receiving party for the streamed content. It is however appreciated that the receiver devices 930, 935 are also able to send data, for example audio.

The receiver devices 930, 935 can be virtual reality display systems, such as head mounted displays 935, but alternatively also (or in addition) displays 930 capable of showing only two-dimensional (2D) content.

Head mounted display is a device capable of showing omnidirectional video or content with three degrees of rotational freedom 3DoF (yaw, pitch, roll). For that purpose, a head mounted display may comprise two screen sections or two screens for displaying images for left and right eyes. The displays are close to the eyes, and therefore lenses are used to make the images easily viewable and for spreading the images to cover as much as possible of the eyes' field of view. The HMD is attached to the head of the user so that it stays in place even when the user turns his head. The device may have an orientation detecting module for determining the head movements and direction of the head. The head mounted display gives an omnidirectional or three degrees of rotational freedom (yaw, pitch, roll). perception of the recorded/streamed content to a user. The user of the head mounted display sees, at a given time instant, only a portion of omnidirectional content, referred to as viewport, the size of which is being defined by the vertical and horizontal field-of-views of the HMD. Most of the audio objects of the immersive content may be visible in the viewport, while some audio objects may reside behind the user, therefore being non-visible in the viewport. As mentioned, viewport is a portion of 360-degree content. Therefore, "viewport" is a term for defining a region of omnidirectional image or video suitable for display and viewing by the user, and is defined as the part of the spherical video that is currently displayed and hence is viewable by the user(s).

In FIG. 9, the sender is illustrated as a 360-degree video system 910. It is appreciated, that instead of the 360-degree video system 910, the sender may be one of the conference participants sharing a 360-degree video, or the sender may be a middlebox or a network appliance, i.e. any computer networking device capable of media distribution. Examples of such middlebox are media gateway, conference server etc. The sender may be also a streaming server configured to deliver the content via the MPEG DASH protocol. Depending on the capabilities of the sender, it may offer viewport-independent or viewport-dependent delivery. Furthermore, if viewport-dependent delivery is offered, the control signals for determining the viewport need to be delivered from the head mounted display, or other device able to display 360-degree content, to the sender.

The viewport can be determined based on head and body movements of the user of the receiver device, such as the HMD 935. The viewport may be sent from the receiver device 935 via control channel to the sender, such as the 360-degree video system 910. Based on the received viewport, the sender is able to send video content relating to the determined viewport. It is appreciated that viewport control from means other than own movements of HMD users can cause motion sickness for the viewers.

For determining the viewport, a VR conferencing system (comprising both sender and receiver) may support 3DoF. A system supporting 3DoF allows rotational head motion around yaw, pitch and roll. In another embodiment, 6DoF (6 Degrees of Freedom) motion may be supported. 6DoF allows further translational head or body movements, in addition to the rotational movements, e.g., translationally moving head or body up, down, right, left, forwards and backwards, including walking around a space in any direction. 6DoF motion may be constrained to a defined space within which the user can move around (e.g., 3DoF+) or unconstrained.

An apparatus according to an embodiment comprises means for obtaining information of available quality features of a sender device for providing omnidirectional visual media content; selecting one or more of the available quality features; and providing an indication of the selected one or more of the available quality features.

The means comprises at least one processor, and a memory including a computer program code, wherein the processor may further comprise processor circuitry. The memory and the computer program code are configured to, with the at least one processor, cause the apparatus to perform the method of obtaining information of available quality features of a sender device for providing omnidirectional visual media content; selecting one or more of the available quality features; and providing an indication of the selected one or more of the available quality features, according to various embodiments.

Figure 10:
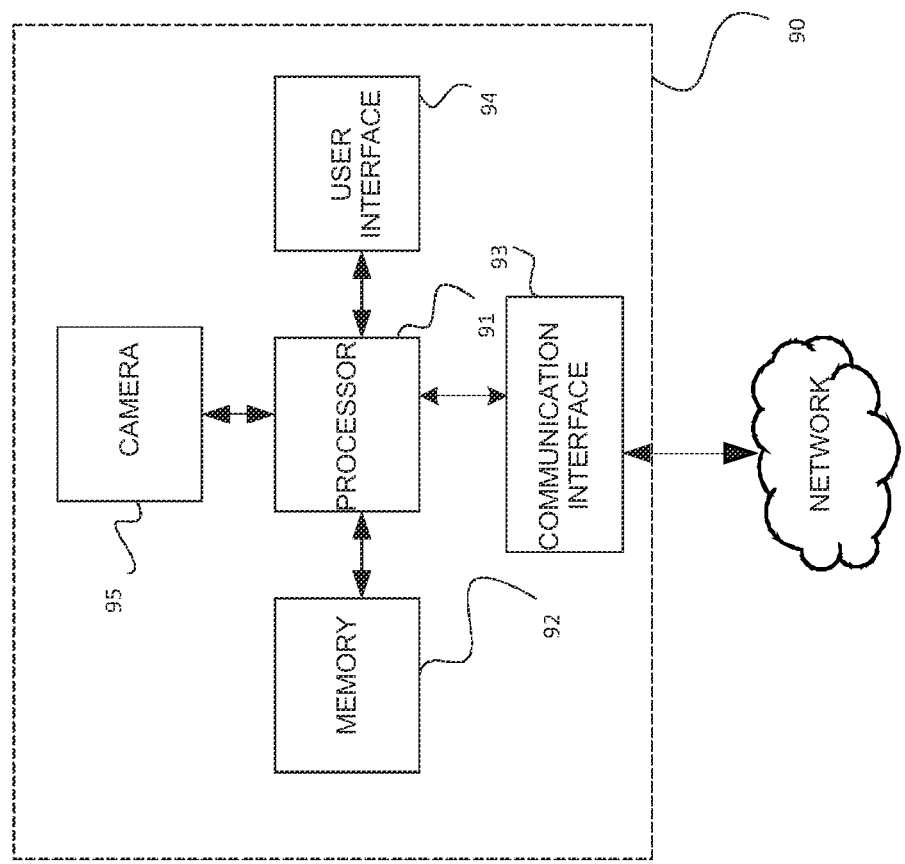
FIG. 10 shows an apparatus according to an embodiment.

An example of an apparatus is shown in FIG. 10. Several functionalities can be carried out with a single physical device, e.g. in a single processor, if desired. The apparatus 90 comprises a main processing unit 91, a memory 92, a user interface 94, a communication interface 93. The apparatus according to an embodiment, shown in FIG. 10, also comprises a camera module 95. The memory 92 stores data including computer program code in the apparatus 90. The computer program code is configured to implement the method according to flowchart of FIG. 6a as a sender device or FIG. 6b as a receiver device. The camera module 95 receives input data, in the form of video stream, to be processed by the processor 91. The communication interface 93 forwards processed data for example to a display of another device, such a HMD. When the apparatus 90 is a video source comprising the camera module 95, user inputs may be received from the user interface. If the apparatus 90 is a middlebox in a network, the user interface is optional, such as the camera module.

The various embodiments may provide advantages. For example, different levels of transition between high quality scheme and consistent quality scheme can be implemented.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises obtaining information of available quality features of a sender device for providing omnidirectional visual media content; selecting one or more of the available quality features; and providing an indication of the selected one or more of the available quality features.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
obtaining information of available quality features of a sender device for providing an omnidirectional visual media content;
selecting one or more of the available quality features;
providing, from the sender device to a receiver device, a first indication of the selected one or more of the available quality features;
receiving from a receiver device a second indication of available quality features of the receiver device for processing the omnidirectional visual media content;
determining, on the basis of the received second indication, quality features that are available both in the sender device and in the receiver device;
selecting, at least by considering a preference for obtaining high quality versus consistent quality, a quality feature that is available both in the sender device and in the receiver device; and
streaming the omnidirectional visual media content using the selected quality feature.

2. The method according to claim 1, further comprising:
receiving from the receiver device a third indication of a quality feature selected by the receiver device, wherein the quality feature selected by the receiver device is one of one or more of the quality features that are available both in the sender device and in the receiver device; and
streaming the omnidirectional visual media content using the selected quality feature from the receiver device.

3. The method according to claim 1, wherein each of the available quality features of the sender device and the receiver device comprises one of the following preferences as options:
a high quality instead of consistent quality;
a consistent quality instead of high quality;
a high quality with specific margin;
an automatic adjustment of consistent or high quality based on the second indication received from the receiver device;
a high quality with directional extended margins based on object tracking;
a high quality with directional extended margins based on audio events; or
a high quality with directional extended margins based on a head motion.

4. The method according to claim 1, wherein each of the available quality features of the sender device and the receiver device comprises a high quality with directional extended margins based on a head motion, and wherein the method further comprises:
extending a margin in a direction of the head motion, when the high quality with directional extended margins based on the head motion option has been selected.

5. The method according to claim 1, wherein the quality feature selected by the receiver device is indicated as a quality-trade-off parameter, values of which indicate relative amounts of high quality versus head-motion invariant quality and corresponding effects on margins around a viewport of a user in the omnidirectional visual media content.

6. The method according to claim 2, wherein at least one of first indication of the available quality features is transmitted, or the third indication of the selected one or more of the available quality features is received over a session description transport protocol.

7. An apparatus comprising:
at least one processor; and
at least one memory storing program code that, when executed by the at least one processor, cause the apparatus to perform at least:
obtaining information of available quality features of a sender device for providing an omnidirectional visual media content;
selecting one or more of the available quality features;
providing, from the sender device to a receiver device, a first an indication of the selected one or more of the available quality features;
receiving from a receiver device a second indication of available quality features of the receiver device for processing the omnidirectional visual media content;
determining, on the basis of the received second indication, quality features that are available both in the sender device and in the receiver device;
selecting, at least by considering a preference for obtaining high quality versus consistent quality, a quality feature that is available both in the sender device and in the receiver device; and
streaming the omnidirectional visual media content using the selected quality feature.

8. The apparatus according to claim 7, wherein the at least one memory stores program code that, when executed by the at least one processor, cause the apparatus at least to perform:
receiving from the receiver device a third indication of a quality feature selected by the receiver device, wherein the quality feature selected by the receiver device is one of the one or more of the quality features that are available both in the sender device and in the receiver device; and
streaming the omnidirectional visual media content using the selected quality feature.

9. A method, comprising:
obtaining information of available quality features of a receiver device for processing omnidirectional visual media content;
providing, from the receiver device to a sender device, a first indication of the available quality features;
receiving from the sender device a second indication of available quality features of the sender device among the available quality features of the receiver device;

selecting, at least by considering a preference for obtaining high quality versus consistent quality, one of the quality features, that are available both in the sender device and in the receiver device;

providing, from the receiver device to the sender device, a third indication of the selected quality feature; and receiving a stream comprising the omnidirectional visual media content using the selected quality feature.

10. An apparatus comprising:

at least one processor; and at least one memory storing program code that, when executed by the at least one processor, cause the apparatus to perform at least:

obtaining information of available quality features of a receiver device for processing omnidirectional visual media content;

providing, from the receiver device to a sender device, a first indication of the available quality features;

receiving from the sender device a second indication of available quality features of the sender device among the available quality features of the receiver device;

selecting, at least by considering a preference for obtaining high quality versus consistent quality, one of the quality features, which are available both in the sender device and in the receiver device;

providing, from the receiver device to the sender device, a third indication of the selected quality feature; and receiving a stream comprising the omnidirectional visual media content using the selected quality feature.

11. The method according to claim 1, wherein each of the available quality features of the sender device and the receiver device comprises a high quality with directional extended margins, and wherein the method further comprises transmitting information of margin limits associated with the directional extended margins over a session description transport protocol.

12. The apparatus according to claim 7, wherein each of the available quality features of the sender device and the receiver device comprises one of the following preferences as options:

a high quality instead of consistent quality;

a consistent quality instead of high quality;

a high quality with specific margin;

an automatic adjustment of consistent or high quality based on the second indication received from the receiver device;

a high quality with directional extended margins based on object tracking;

a high quality with directional extended margins based on audio events; or a high quality with directional extended margins based on a head motion.

13. The apparatus according to claim 10, wherein each of the available quality features of the sender device and the receiver device comprises a high quality with directional extended margins based on a head motion, and wherein the at least one memory stores program code that, when executed by the at least one processor, cause the apparatus at least to perform:

extending a margin in a direction of the head motion, when the high quality with directional extended margins based on head motion option has been selected.

14. The apparatus according to claim 10, wherein at least one of the first indication of the available quality features, or the third indication of the selected one or more of the available quality features is transmitted over a session description transport protocol.

15. The apparatus according to claim 10, wherein each of the available quality features of the sender device and the receiver device comprises a high quality with directional extended margins, and wherein the at least one memory stores program code that, when executed by the at least one processor, cause the apparatus at least to perform transmitting information of margin limits associated with the directional extended margins is over a session description transport protocol.

16. The apparatus according to claim 14, wherein the session description transport protocol comprises a session description protocol (SDP).

17. The apparatus according to claim 15, wherein the session description transport protocol comprises a session description protocol (SDP).

18. The method according to claim 6, wherein the session description transport protocol comprises a session description protocol (SDP).

19. The apparatus according to claim 7, wherein the method further comprises, for a selected quality feature corresponding to a high-quality scheme, applying the high-quality scheme by reducing viewport margins, or for a selected quality feature corresponding to a head-motion invariant quality, applying the head-motion invariant quality by reducing a quality of the viewport while maintaining the viewport margins.

20. The apparatus according to claim 10, wherein the method further comprises, for a selected quality feature corresponding to a high-quality scheme, applying the high-quality scheme by reducing viewport margins, or for a selected quality feature corresponding to a head-motion invariant quality, applying the head-motion invariant quality by reducing a quality of the viewport while maintaining the viewport margins.

* * * * *